United States Patent [19]

Sliger

[11] Patent Number: 5,745,313

[45] Date of Patent: Apr. 28, 1998

[54] METHOD AND APPARATUS FOR EXPANDING DATA STORAGE CAPACITY ON A FLOPPY DISKETTE

[75] Inventor: Michael V. Sliger, Issaquah, Wash.

[73] Assignee: Microsoft Corporation, Redmond, Wash.

[21] Appl. No.: 409,217

[22] Filed: Mar. 23, 1995

[51] Int. Cl.$^6$ .................................................. G11B 5/09
[52] U.S. Cl. .............................................. 360/48; 360/50
[58] Field of Search ................................ 360/40, 48, 50

[56]  References Cited

U.S. PATENT DOCUMENTS

| | | | |
|---|---|---|---|
| 4,731,680 | 3/1988 | Moriyama et al. | 360/78.13 |
| 4,811,280 | 3/1989 | Berkowitz et al. | 360/50 |
| 4,979,054 | 12/1990 | McCullough et al. | 360/48 |
| 5,008,819 | 4/1991 | Gorbatenko . | |
| 5,535,069 | 7/1996 | Chiao et al. | 360/77.03 |

Primary Examiner—Aristotelis M. Psitos
Assistant Examiner—Regina Y. Neal
Attorney, Agent, or Firm—Jones & Askew, LLP

[57]  ABSTRACT

A method and apparatus for maximizing the data storage capacity of a floppy diskette. The present invention provides a format that reduces the inter-sector gap between adjacent sectors on each track to eight bytes. The storage space gained from the reduction in gap size is used to add additional sectors to each track on the diskette, thereby providing a total of twenty-one sectors per track. Because the gap between sectors is reduced to such a small size, the disk controller may not be able to process the data from one sector before the adjacent sector is to be read. Therefore, sectors are arranged on each track in a 2:1 interleave arrangement, such that one sector separates consecutively-numbered sectors. Additionally, to increase performance, the end of the last sector on each track is offset from the beginning of the first sector on the next track by four sectors.

6 Claims, 14 Drawing Sheets

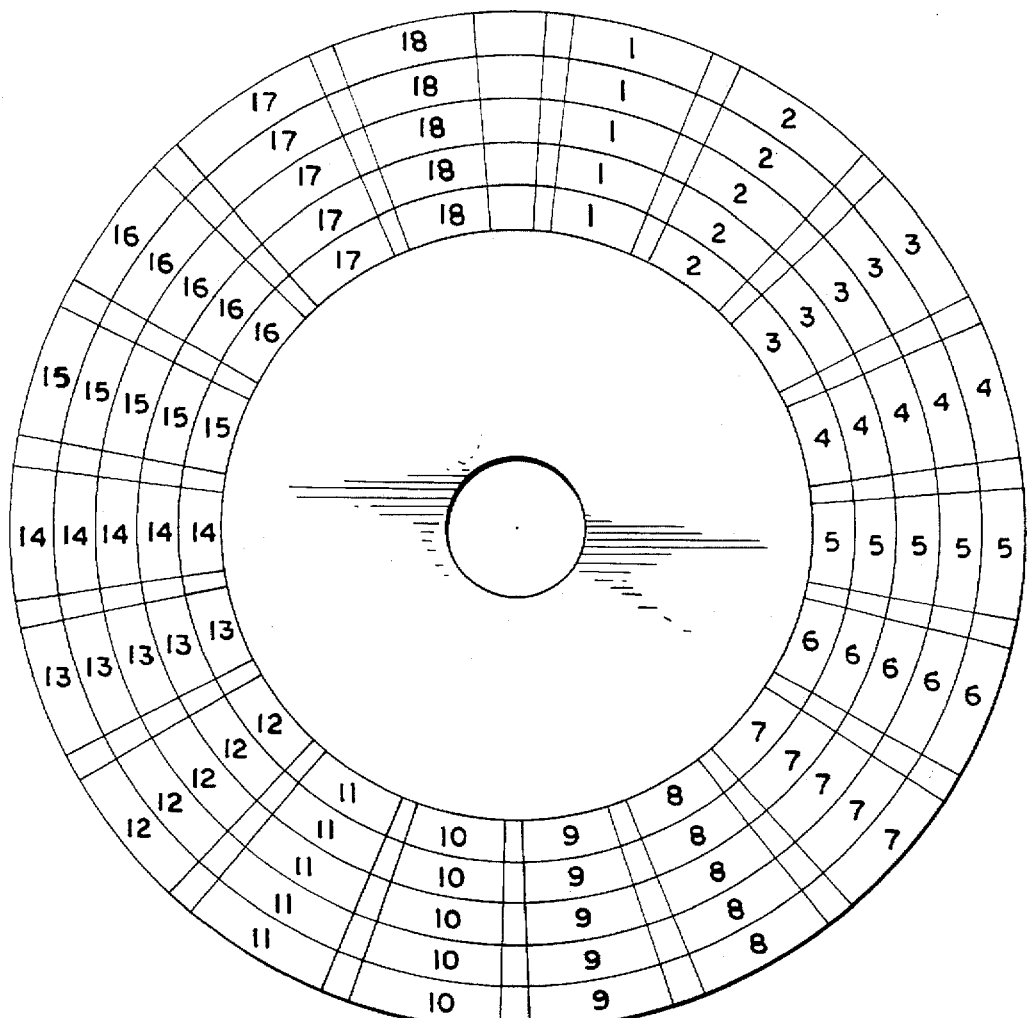
Fig_1 PRIOR ART
| DESCRIPTION | CONTENT | # OF BYTES |
|---|---|---|
| ADDRESS SYNC | 0 X 00 | 12 |
| ADDRESS MARK | 0 X A1* X 3, 0XFE | 4 |
| ADDRESS | TRACK,SIDE,SECTOR,SIZE | 4 |
| ADDRESS CRC | CCITT | 2 |
| GAP2 | 0 X 4E | 22 |
| DATA SYNC | 0 X 00 | 12 |
| DATA MARK | 0 X A1* X 3, 0XFB | 4 |
| DATA | DATA | 512 |
| DATA CRC | CCITT | 2 |
| TOTAL | | 574 |
Fig_2 PRIOR ART

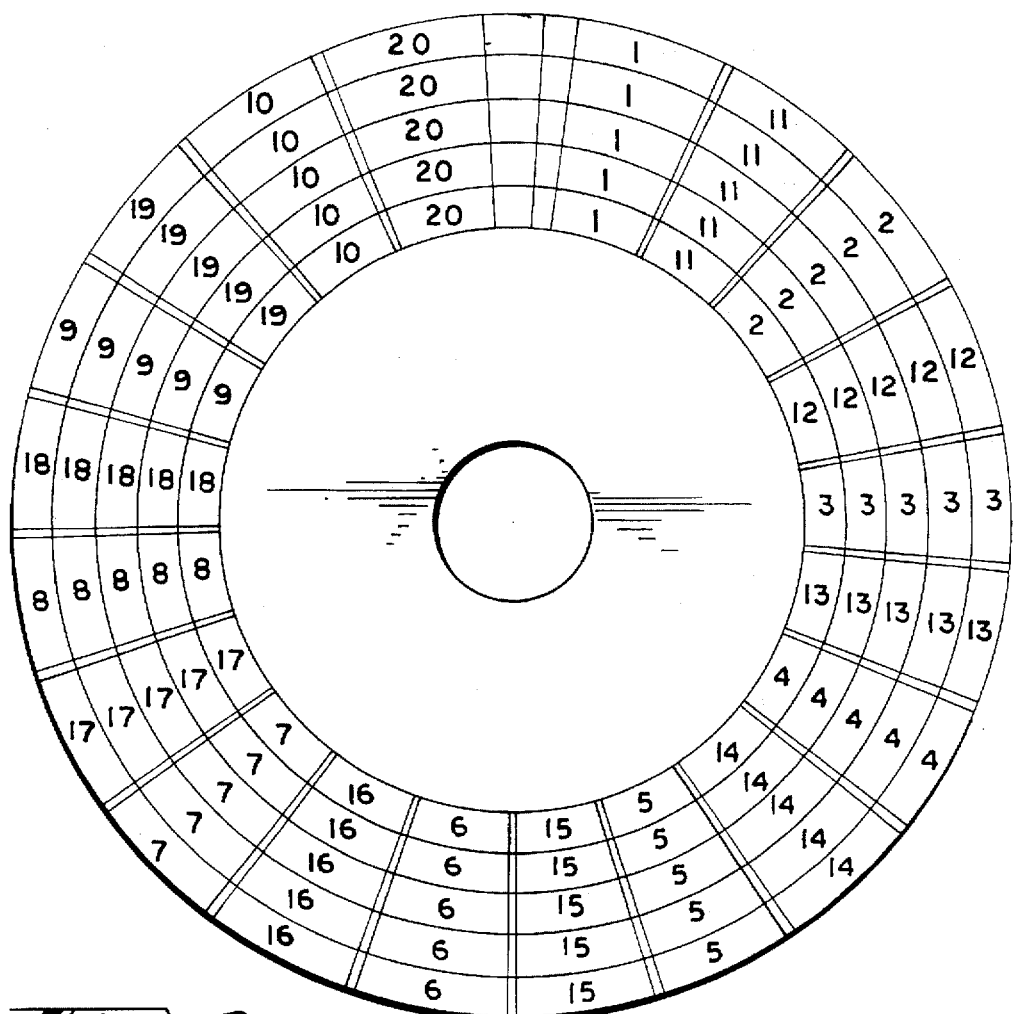
Fig_3 PRIOR ART
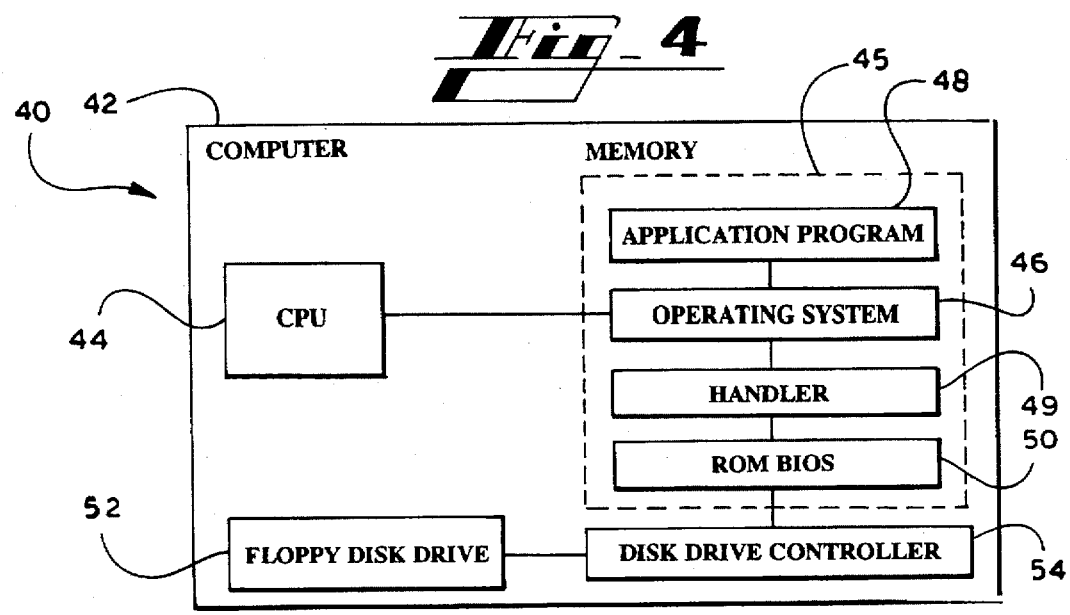
Fig_4

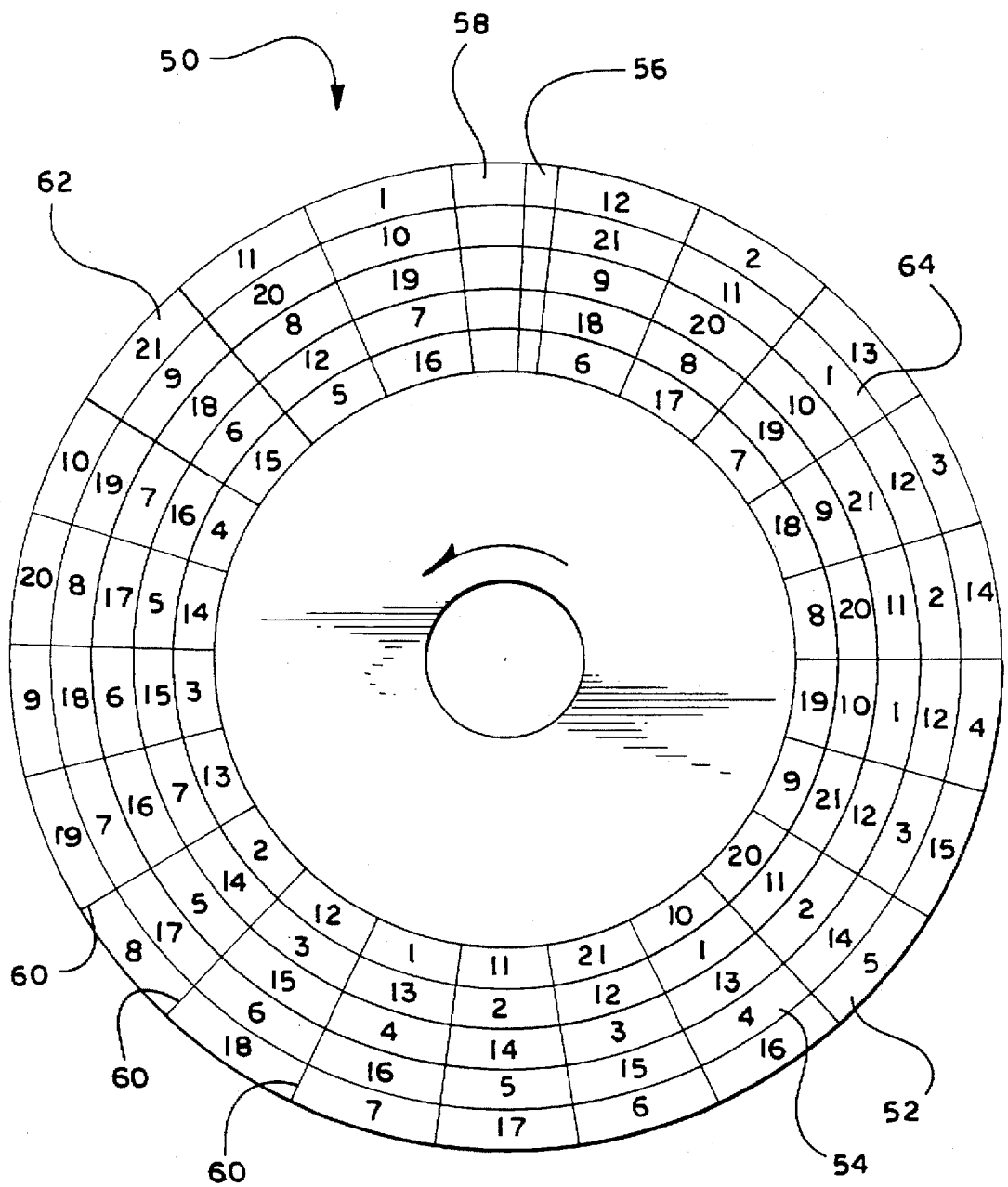
Fig_5

| DESCRIPTION | CONTENT | # OF BYTES |
|---|---|---|
| START-OF-TRACK-GAP | 0 X 4E X 80 | 80 |
| 1ST SECTOR | SECTOR | 574 |
| GAP 3 | 0 X 4E X 8 | 8 |
| 2ND SECTOR | SECTOR | 574 |
| GAP 3 | 0 X 4E X 8 | 8 |
| 3RD SECTOR | SECTOR | 574 |
| GAP 3 | 0 X 4E X 8 | 8 |
| 4TH SECTOR | SECTOR | 574 |
| GAP 3 | 0 X 4E X 8 | 8 |
| 5TH SECTOR | SECTOR | 574 |

• • •

| GAP 3 | 0 X 4E X 8 | 8 |
|---|---|---|
| 20TH SECTOR | SECTOR | 574 |
| GAP 3 | 0 X 4E X 8 | 8 |
| 21ST SECTOR | SECTOR | 574 |
| END-OF-TRACK GAP | ANY X 206 (NOMINAL) | 206 |
| TOTAL | | 12500 |

*Fig_6A*

| DESCRIPTION | CONTENT | # OF BYTES |
|---|---|---|
| START-OF-TRACK-GAP | 0 X 4E X 146 | 146 |
| 1ST SECTOR | SECTOR | 574 |
| GAP 3 | 0 X 4E X 101 | 101 |
| 2ND SECTOR | SECTOR | 574 |
| GAP 3 | 0 X 4E X 101 | 101 |
| 3RD SECTOR | SECTOR | 574 |
| GAP 3 | 0 X 4E X 101 | 101 |
| 4TH SECTOR | SECTOR | 574 |
| GAP 3 | 0 X 4E X 101 | 101 |
| 5TH SECTOR | SECTOR | 574 |

• • •

| GAP 3 | 0 X 4E X 101 | 101 |
|---|---|---|
| 17TH SECTOR | SECTOR | 574 |
| GAP 3 | 0 X 4E X 101 | 101 |
| 18TH SECTOR | SECTOR | 574 |
| END-OF-TRACK GAP | ANY X 305 (NOMINAL) | 305 |
| TOTAL | | 12500 |

*Fig_6B* PRIOR ART

| BYTE OFFSET(S) | VALUE | USAGE |
|---|---|---|
| 0..2 | HEX E9 . XX . 90 | JMP INSTRUCTION TO BOOT CODE |
| 3..10 | ASCII- "MDSMF3.2" (HEX 4D.53.44.4D.46.33.2E.32) | OEM ID (THIS SIGNATURE IS RECOGNIZED BY DMF - AWARE SOFTWARE) |
| 11..12 | 512 | BPB: BYTES PER SECTOR |
| 13 | 4 | BPB: SECTORS PER CLUSTER |
| 14..15 | 1 | BPB: RESERVED SECTOR |
| 16 | 2 | BPB: NUMBER OF COPIES OF FAT |
| 17..18 | 16 | BPB: NUMBER OF ROOT DIRECTORY ENTRIES |
| 19..20 | 3,36 | BPB: TOTAL NUMBER OF SECTORS |
| 21 | HEX - F0 | BPB: MEDIA DESCRIPTOR BYTE |
| 22..23 | 3 | BPB: SECTORS PER COPY OF FAT |
| 24..25 | 21 | BPB: NUMBER OF SECTORS PER TRACK |
| 26..27 | 2 | BPB: NUMBER OF HEADS |
| 28..31 | 0 | BPB: NUMBER OF HIDDEN SECTORS |
| 32..35 | 0 | BPB: "HUGE" SECTORS |
| 36 | 0 | BOOT DRIVE NUMBER |
| 37 | 0 | RESERVED |
| 38 | HEX 29 | EXTENDED BPB SIGNATURE |
| 39..42 | | VOLUME SERIAL NUMBER |
| 43..53 | ASCII | VOLUME LABEL |
| 54..61 | ASCII "FAT12" (HEX 46,41,54,31,32,20,20,20) | FILE SYSTEM TYPE (LEFT-JUSTIFIED, SPACE FILLED) |
| 62..509 | | EXECUTABLE BOOT CODE |
| 510..511 | HEX 55, AA | BOOT SECTOR SIGNATURE |

Fig_7A

| BYTE OFFSET(S) | VALUE | USAGE |
|---|---|---|
| 0..2 | | JMP INSTRUCTION TO BOOT CODE |
| 3..10 | ASCII | OEM ID |
| 11..12 | 512 | BPB: BYTES PER SECTOR |
| 13 | 1 | BPB: SECTORS PER CLUSTER |
| 14..15 | 1 | BPB: RESERVED SECTOR |
| 16 | 2 | BPB: NUMBER OF COPIES OF FAT |
| 17..18 | 240 | BPB: NUMBER OF ROOT DIRECTORY ENTRIES |
| 19..20 | 1,232 | BPB: TOTAL NUMBER OF SECTORS |
| 21 | HEX F0 | BPB: MEDIA DESCRIPTOR BYTE |
| 22..23 | 9 | BPB: SECTORS PER COPY OF FAT |
| 24..25 | 18 | BPB: NUMBER OF SECTORS PER TRACK |
| 26..27 | 2 | BPB: NUMBER OF HEADS |
| 28..31 | 0 | BPB: NUMBER OF HIDDEN SECTORS |
| 32..35 | 0 | BPB: "HUGE" SECTORS |
| 36 | 0 | BOOT DRIVE NUMBER |
| 37 | 0 | RESERVED |
| 38 | HEX 29 | EXTENDED BPB SIGNATURE |
| 39..42 | | VOLUME SERIAL NUMBER |
| 43..53 | ASCII | VOLUME LABEL |
| 54..61 | ASCII "FAT12" (HEX 46,41,54,31,32,20,20,20) | FILE SYSTEM TYPE (LEFT-JUSTIFIED, SPACE FILLED) |
| 62..509 | | EXECUTABLE BOOT CODE |
| 510..511 | HEX 55, AA | BOOT SECTOR SIGNATURE |

Fig_7B

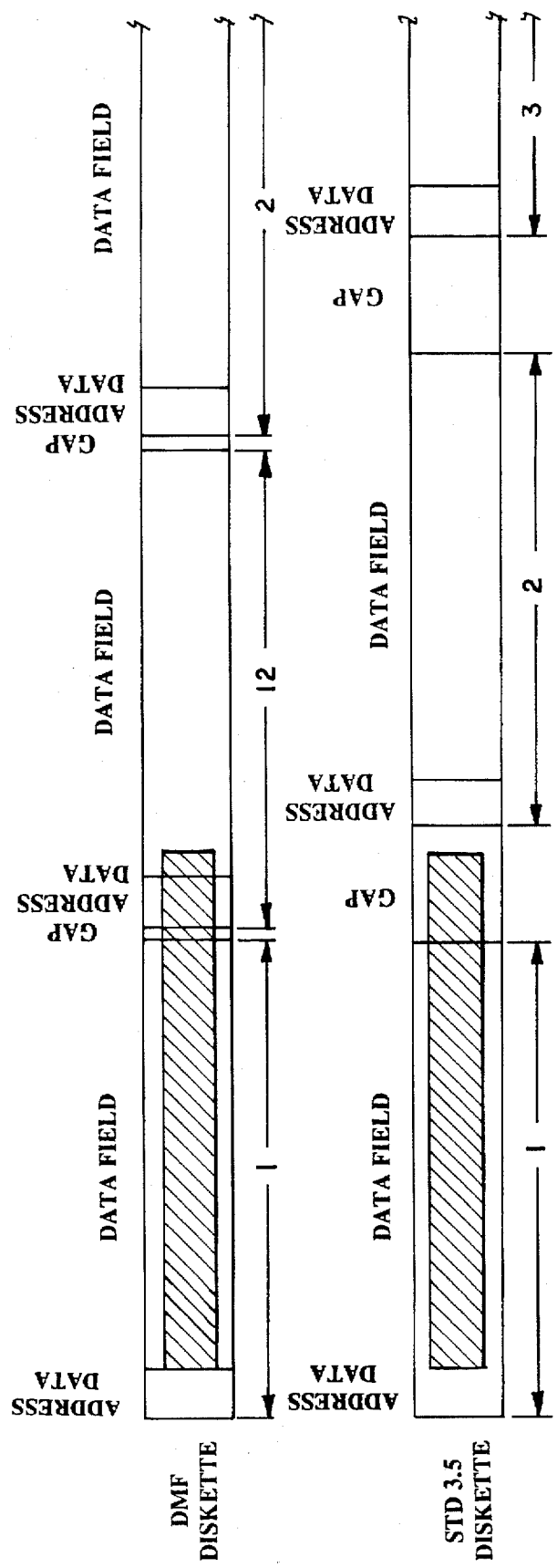

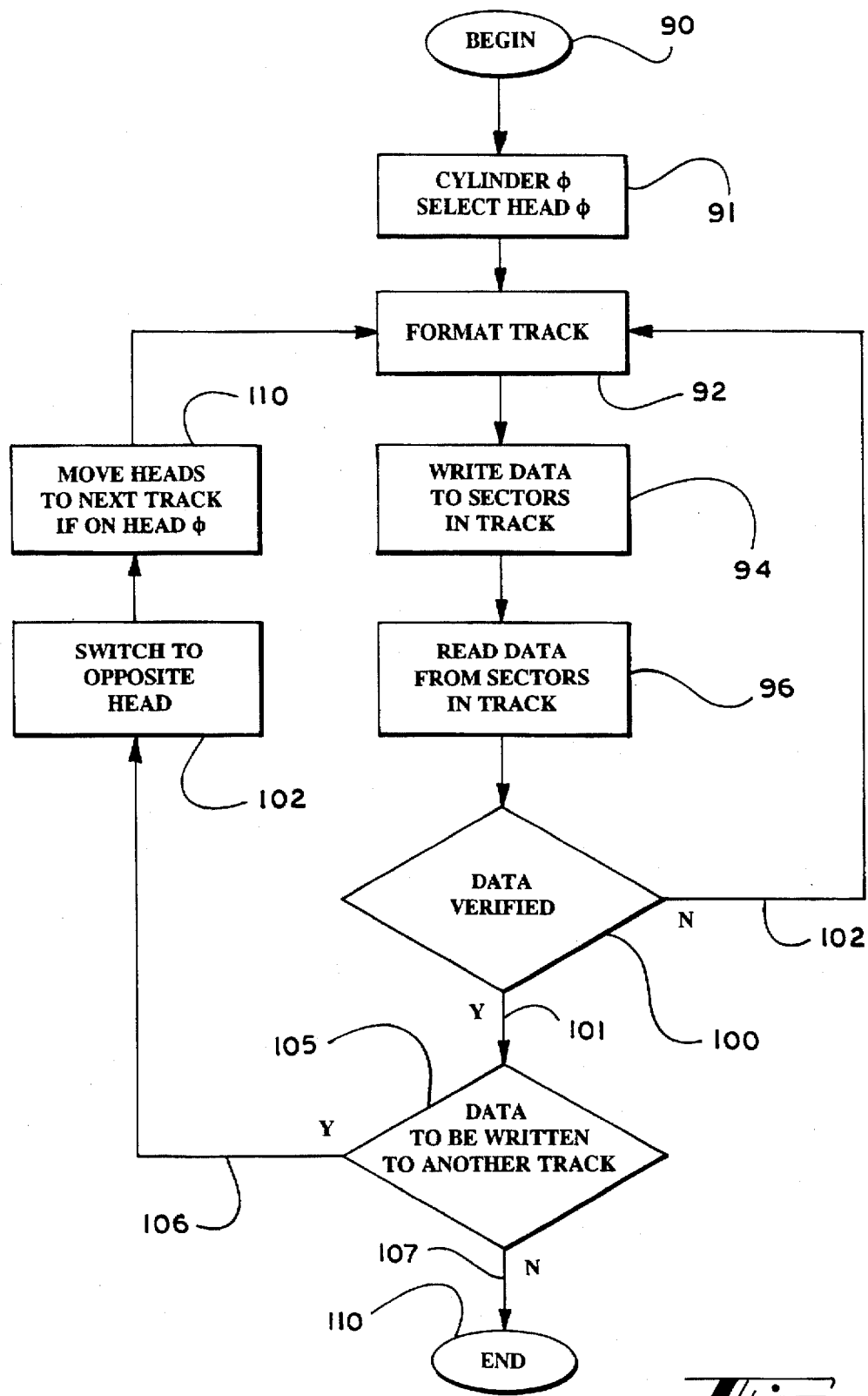
Fig_9

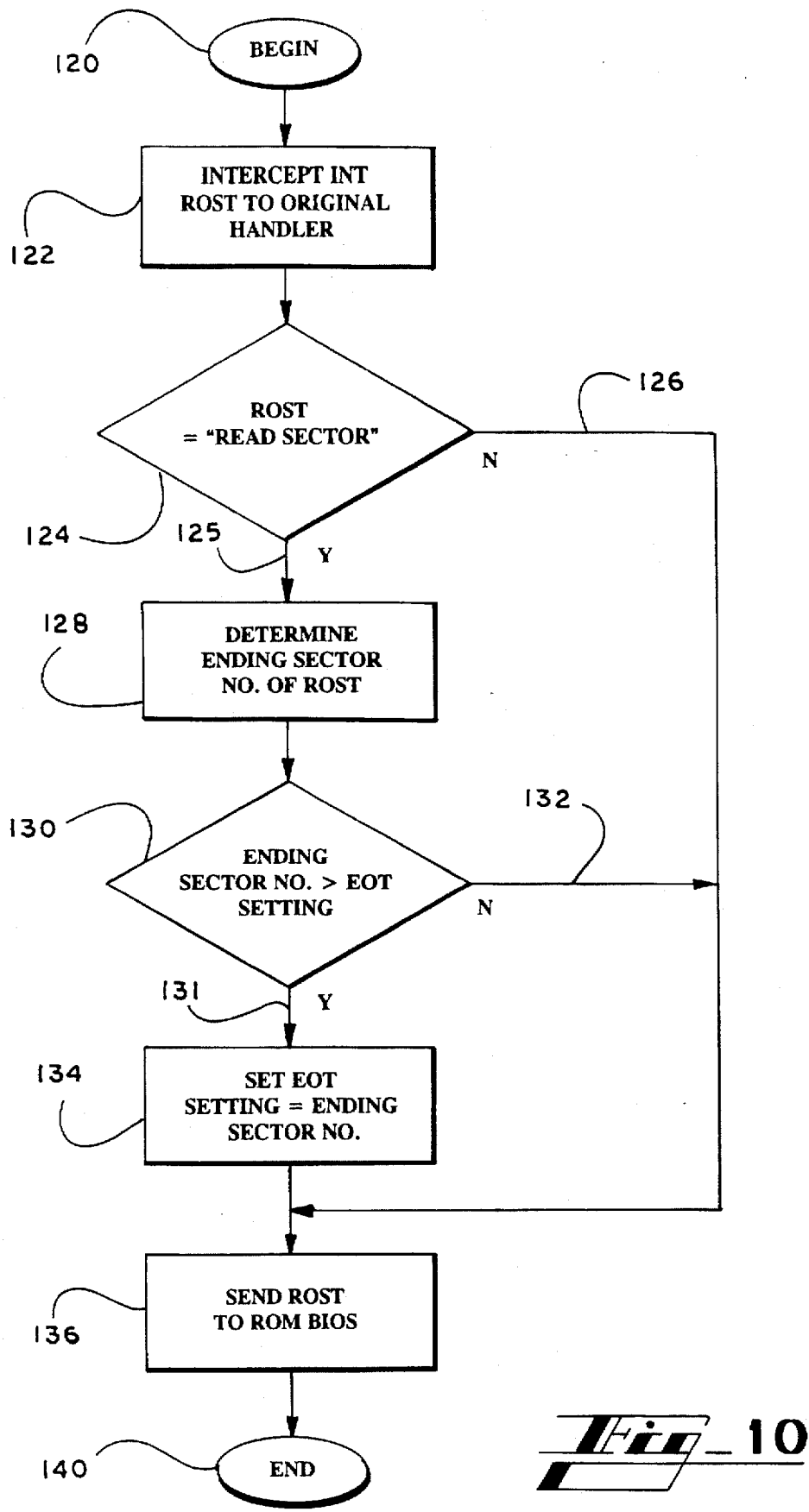

| STARTING SECTOR | ENDING SECTOR | RESULT |
|---|---|---|
| 1 | 1 | PASS |
| 1 | 18 | PASS |
| 1 | 19 | FAIL |
| 10 | 18 | PASS |
| 10 | 19 | FAIL |
| 17 | 18 | PASS |
| 17 | 19 | FAIL |
| 18 | 18 | PASS |
| 18 | 19 | FAIL |
| 18 | 21 | FAIL |
| 19 | 19 | PASS |
| 19 | 21 | PASS |
| STARTING SECTOR | ENDING SECTOR | OPERATION 1 | OPERATION 2 |
|---|---|---|---|
| 1 | 1 | 1 | N/A |
| 1 | 18 | 1..18 | N/A |
| 1 | 19 | 1..18 | 19 |
| 10 | 18 | 10..18 | N/A |
| 10 | 19 | 10..18 | 19 |
| 17 | 18 | 17..18 | N/A |
| 17 | 19 | 17..18 | 19 |
| 18 | 18 | 18 | N/A |
| 18 | 19 | 18 | 19 |
| 18 | 21 | 18 | 19..21 |
| 19 | 19 | 19 | N/A |
| 19 | 21 | 19..21 | N/A |

| DESCRIPTION | CONTENT | # OF BYTES |
|---|---|---|
| ADDRESS SYNC | 0 X 00 | 12 |
| ADDRESS MARK | 0 X A1 * X 3, 0 X FE | 4 |
| ADDRESS | TRACK,SIDE,SECTOR, | 4 |
| ADDRESS CRC | CCITT | 2 |
| GAP2 | 0 X 4E | 22 |
| DATA SYNC | 0 X 00 | 12 |
| DATA MARK | 0 X A1 * x 3, 0 x FB | 4 |
| DATA | DATA | 1024 |
| DATA CRC | CCITT | 2 |
| TOTAL | | 1086 |

Fig. 16
PRIOR ART

| DESCRIPTION | CONTENT | # OF BYTES |
|---|---|---|
| START-OF-TRACK GAP | 0 X 4E X 146 | 146 |
| 1ST SECTOR | SECTOR | 1086 |
| GAP3 | 0 C 4E X 36 | 36 |
| 2ND SECTOR | SECTOR | 1086 |
| GAP3 | 0 X 4E X 36 | 36 |
| 3RD SECTOR | SECTOR | 1086 |
| GAP3 | 0 X 4E X 36 | 36 |
| 4TH SECTOR | SECTOR | 1086 |
| GAP3 | 0 X 4E X 36 | 36 |
| 5TH SECTOR | SECTOR | 1086 |
| GAP3 | 0 X 4E X 36 | 36 |
| 6TH SECTOR | SECTOR | 1086 |
| GAP3 | 0 X 4E X 36 | 36 |
| 7TH SECTOR | SECTOR | 1086 |
| GAP3 | 0 X 4E X 36 | 36 |
| 8TH SECTOR | SECTOR | 1086 |
| GAP3 | 0 X 4E X 36 | 36 |
| 9TH SECTOR | SECTOR | 1086 |
| END-OF-TRACK GAP | ANY X 209 (NOMINAL) | 209 |
| TOTAL | | 10417 |

Fig. 17

| DESCRIPTION | CONTENT | # OF BYTES |
|---|---|---|
| START-OF-TRACK GAP | 0 X 4E X 146 | 146 |
| 1ST SECTOR | SECTOR | 1086 |
| GAP3 | 0 X 4E X 128 | 128 |
| 2ND SECTOR | SECTOR | 1086 |
| GAP3 | 0 X 4E X 128 | 128 |
| 3RD SECTOR | SECTOR | 1086 |
| GAP3 | 0 X 4E X 128 | 128 |
| 4TH SECTOR | SECTOR | 1086 |
| GAP3 | 0 X 4E X 128 | 128 |
| 5TH SECTOR | SECTOR | 1086 |
| GAP3 | 0 X 4E X 128 | 128 |
| 6TH SECTOR | SECTOR | 1086 |
| GAP3 | 0 X 4E X 128 | 128 |
| 7TH SECTOR | SECTOR | 1086 |
| GAP3 | 0 X 4E X 128 | 128 |
| 8TH SECTOR | SECTOR | 1086 |
| END-OF-TRACK GAP | ANY X 687 (NOMINAL) | 687 |
| TOTAL | | 10417 |

Fig. 18
PRIOR ART

| BYTE OFFSET(S) | VALUE | USAGE |
|---|---|---|
| 0..2 |  | JMP INSTRUCTION TO BOOT CODE |
| 3..10 | ASCII | OEM ID |
| 11..12 | 1024 | BPB: BYTES PER SECTOR |
| 13 | 2 | BPB: SECTORS PER CLUSTER |
| 14..15 | 1 | BPB: RESERVED SECTOR |
| 16 | 2 | BPB: NUMBER OF COPIES OF FAT |
| 17..18 | 32 | BPB: NUMBER OF ROOT DIRECTORY ENTRIES |
| 19..20 | 1386 | BPB: TOTAL NUMBER OF SECTORS |
| 21 | HEX F0 | BPB: MEDIA DESCRIPTOR BYTE |
| 22..23 | 2 | BPB: SECTORS PER COPY OF FAT |
| 24..25 | 9 | BPB: NUMBER OF SECTORS PER TRACK |
| 26..27 | 2 | BPB: NUMBER OF HEADS |
| 28..31 | 0 | BPB: NUMBER OF HIDDEN SECTORS |
| 32..35 | 0 | BPB: "HUGE" SECTORS |
| 36 | 0 | BOOT DRIVE NUMBER |
| 37 | 0 | RESERVED |
| 38 | HEX 29 | EXTENDED BPB SIGNATURE |
| 39..42 |  | VOLUME SERIAL NUMBER |
| 43..53 | ASCII | VOLUME LABEL |
| 54..61 | ASCII "FAT12" (HEX 46,41,54,31,32,20,20,20) | FILE SYSTEM TYPE (LEFT-JUSTIFIED, SPACE FILLED) |
| 62..509 |  | EXECUTABLE BOOT CODE |
| 510..511 | HEX 55, AA | BOOT SECTOR SIGNATURE |

| BYTE OFFSET(S) | VALUE | USAGE |
|---|---|---|
| 0..2 |  | JMP INSTRUCTION TO BOOT CODE |
| 3..10 | ASCII | OEM ID |
| 11..12 | 1024 | BPB: BYTES PER SECTOR |
| 13 | 1 | BPB: SECTORS PER CLUSTER |
| 14..15 | 1 | BPB: RESERVED SECTOR |
| 16 | 2 | BPB: NUMBER OF COPIES OF FAT |
| 17..18 | 192 | BPB: NUMBER OF ROOT DIRECTORY ENTRIES |
| 19..20 | 1,232 | BPB: TOTAL NUMBER OF SECTORS |
| 21 | HEX F0 | BPB: MEDIA DESCRIPTOR BYTE |
| 22..23 | 2 | BPB: SECTORS PER COPY OF FAT |
| 24..25 | 8 | BPB: NUMBER OF SECTORS PER TRACK |
| 26..27 | 2 | BPB: NUMBER OF HEADS |
| 28..31 | 0 | BPB: NUMBER OF HIDDEN SECTORS |
| 32..35 | 0 | BPB: "HUGE" SECTORS |
| 36 | 0 | BOOT DRIVE NUMBER |
| 37 | 0 | RESERVED |
| 38 | HEX 29 | EXTENDED BPB SIGNATURE |
| 39..42 |  | VOLUME SERIAL NUMBER |
| 43..53 | ASCII | VOLUME LABEL |
| 54..61 | ASCII "FAT12" (HEX 46,41,54,31,32,20,20,20) | FILE SYSTEM TYPE (LEFT-JUSTIFIED, SPACE FILLED) |
| 62..509 |  | EXECUTABLE BOOT CODE |
| 510..511 | HEX 55, AA | BOOT SECTOR SIGNATURE |

METHOD AND APPARATUS FOR EXPANDING DATA STORAGE CAPACITY ON A FLOPPY DISKETTE

TECHNICAL FIELD

The present invention relates generally to a method, apparatus, and format for expanding the data storage capacity of a floppy diskette, and specifically to a method and format for increasing the number of sectors used to store data on the diskette.

BACKGROUND OF THE INVENTION

One of the media utilized by computers to store data is a magnetic disk drive. Magnetic disk drives allow computers to alter the data that is stored thereon, such that data can be read from and written onto the magnetic disk. Magnetic disk drives include hard disks that are permanently provided within the computer for storing vast amounts of data, and floppy disks that are removably inserted into the computer by the user for storing smaller amounts of data. Floppy disks represent the primary medium used by software vendors to supply application programs to users of personal computers.

Floppy disk drives include a mylar disk coated with magnetic material. The disk includes a data storage area on both its top and bottom surfaces. Data is encoded on the disk by magnetizing areas of the disk surface. Data is retrieved or added to the disk by a read/write head. Each head of the magnetic floppy disk drive consists of a tiny electromagnet attached to an arm, with the electromagnet being positioned very close to the surface of the disk. One such head is provided for each recording surface on the disk. The arms move the heads back and forth over the surface of the disk in a generally radial path. A head actuator moves the arms to control the movement of the heads. When data is written onto a disk, the head is positioned over the appropriate area of the disk where the data is to be written while the disk rotates past the head. An electrical current, supplied to the head, produces a magnetic field that magnetizes a small area of the disk near the head. This small magnetized area represents a digital bit. Similarly, when data is read from a disk drive, the head is positioned over the appropriate magnetized area of the disk, which induces a current in the head. The current induced in the head is then decoded into digital data.

The center of the disk is connected, via a spindle, to a motor that spins the disk at a constant rate. Typically, floppy disks spin at a rate of 300 revolutions per minute.

Both hard disks and floppy disks are connected to a disk controller that directs and controls the reading from and writing to the disk. The disk controller handles such tasks as positioning the heads, mediating between the disk drive and the microprocessor, and controlling the transfer of information to and from memory. In some machines, the disk controller is built into the computer system while on other machines the disk controller is on an expansion card.

Each floppy diskette includes data storage areas on the two sides of a round mylar disk. The data storage area on each side of the disk is divided into concentric circles called tracks. For hard disks, the number of tracks on a disk varies widely, but for removable media numerous standards are followed to allow interchange between different computers. Standard 3.5-inch floppy diskettes usually contain 80 tracks on each side of the disk. The two tracks at corresponding locations on each side of the disk are called a cylinder. Thus, there are 80 cylinders on each floppy diskette.

Each track on the disk is divided into an equal number of sectors. On standard 3.5-inch floppy diskettes, each track is divided into eighteen sectors, as shown in FIG. 1, which illustrates 5 of the 80 tracks on the disk. Typically, the sectors are arranged in wedges, such that the sectors at the outer edge, or beginning, of the disk take up more linear space along a track than the sectors near the inner edge, or end, of the disk. However, the data stored within each sector is arranged such that each sector contains an identical amount of data. This allows the disk to be spun at a constant angular rate to retrieve equal amounts of data regardless of the location of the sector on the disk. The location of each sector is stored in a special data structure on the disk, thereby making each sector independently accessible.

Sectors are grouped into disk-storage units called clusters. Clusters consist of a fixed number of sectors that the operating system uses to determine where on the disk to read or write data. It should be understood that the grouping of sectors into clusters is a virtual grouping performed by the operating system, such as the Microsoft MS-DOS operating system, and is not a physical definition of the storage area on the surface of the disk.

Standard 3.5-inch high density (HD) diskettes have a gross unformatted storage capacity of approximately 2.0 megabytes (Mb). However, the standard format used for this media decreases the data storage capacity to approximately 1.44 Mb. Data is usually stored on the disk in groups called files, with each file being independently accessible. The clusters in which each file is stored are identified and stored in a data structure on the disk so that the computer can quickly access the necessary data when desired.

It should be understood that when diskette capacity is identified in terms of bytes, kilobytes, and megabytes, the actual number of bytes capable of being stored on the diskette may not necessarily be exactly identified by the numerical designation of diskette capacity. For example, the 2.0 Mb unformatted storage capacity of 3.5-inch diskettes can store 12,500 bytes on each track for a total of 2,000,000 bytes. However, a diskette designated as a 1.44 Mb actually stores more than 1,440,000 bytes. Formatted data capacity is more accurately defined in terms of kilobytes, with each kilobyte being designated as 1024 bytes.

Because diskette data capacity is usually defined in terms of kilobytes or megabytes (which are defined as 1000 kilobytes), a diskette having a capacity defined as 1.44 Mb is thought of as storing 1440 kilobytes. However, because 1440 kilobytes actually equals 1,474,560 bytes (1440× 1024), a 1.44 Mb diskette actually stores over 1.47 Mb of data. However, for purposes of defining diskette capacity and for the purposes of the discussion below, a kilobyte is defined to contain 1024 bytes and a 1.44 Mb diskette has a capacity of 1440 kilobytes, for a total storage capacity of 1,474,560 bytes.

When a diskette is initially formatted, tracks and sectors are magnetically defined on the data storage area of the disk. The formatting process, whether performed by the operating system or a formatting utility program, defines each sector as a portion of a track and records address information at the front of each sector. During formatting, the system writes the hexadecimal value "F6" into each sector. Thus, after formatting, the system can verify the value stored in each sector to determine if a sector has a problem with its recording surface.

Each sector on a floppy diskette includes several fields for storing information. The allocation of bytes within each field are shown in the table of FIG. 2. Located at the beginning of each sector are several fields for storing address information that allows each sector to be uniquely identified. The largest field, usually containing 512 bytes, is used to store file data. At the end of each sector is a field that identifies the end of the sector.

The address field of each sector contains the sector's logical sector number. The logical sector number assigned to the sector is the number used to identify the sector and is not based on the physical order of sectors on the disk. Thus, for example, sectors having logical sector numbers 1 and 11 may be adjacent to one another on the disk, depending on the arrangement of sectors, while sector numbers 10 and 11 may be located far apart.

The disk controller processes data read from the fields of each sector. Thus, the disk controller can determine when a given sector is passing beneath the head. However, the controller requires a certain amount of time to process the data read from each sector and prepare for the next sector such that locating adjacent sectors too close together may restrict the time in which the controller must process data. If the controller does not have sufficient time to process sector data before the next sector passes beneath the head, the address field of the next sector may not be read by the disk controller. Consequently, the next sector is not identified by the disk controller and is missed.

Therefore, adjacent sectors on each track are separated by an inter-sector gap. One purpose of the gap is to allow for slight variations in the rotational speed of the motor that spins the disk. During writing, the controller will emit the new data field over a relatively constant period of time. Motor speed variations may cause the amount of linear track space recorded during this period to vary. If the motor speed is higher than during the initial formatting process, the re-written data field will cover more track space than the original. If no gap space is established during formatting, the following sector will be partially overwritten, thereby becoming unreadable.

The gap also allows the disk controller sufficient time to process the data read from the current sector before reading data from the next sector. If sectors are located too closely together, the controller may not be able to adequately process the data from the current sector before the beginning of the next sector has been spun beneath the head. If this occurs, the controller cannot read the address information from the next sector and thus cannot identify the next sector. Consequently, the system must wait for that sector to again pass beneath the head, which requires a full revolution of the disk. This causes an undesirable delay in processing time and thus degrades system performance.

Therefore, inter-sector gaps are necessary to support the reading and writing of data to adjacent sectors. On standard 3.5-inch floppy diskettes, the inter-sector gap is 101 bytes. It should be recognized that because sectors contain about 574 bytes, with only 512 of those bytes allocated for the storage of user data, these gaps consume a large percentage of the data storage area that is not devoted to the storage of data.

When data stored on the disk is to be accessed by the operating system, the heads are first moved to the track that contains the sector that stores the desired data. The correct head, corresponding to the correct side of the disk, is selected and the controller examines address data from sectors spinning beneath the head. When the controller detects that the desired sector is beneath the head, the contents of the data field of the sector are read into system memory. Thus, because the controller detects the desired sector by reading sector address data and not by the geometric location of the sector on the disk, the sectors to be read need not be arranged in numerically sequential order, but can be arranged in any order.

On IBM-compatible computers, adjacent sectors on each track are numbered sequentially, such that consecutively numbered sectors are located adjacent to one another. This arrangement is successful because the 101 byte gaps provide adequate processing time between sectors. If the gaps were substantially reduced, consecutive sectors could not be transferred. In this case, the controller must wait for each sector to again pass beneath the head, which requires an entire revolution of the disk for each sector.

To solve this problem, disks, especially hard disks, are formatted using an interleaving technique. Interleaving is the arrangement of sectors such that consecutively-numbered sectors are not located adjacent to one another on the disk. A 2:1 interleave means that consecutively-numbered sectors are separated by one other sector. An example of a 2:1 interleave would include sectors arranged on a track in the following order: 1, 10, 2, 11, 3, 12, and so forth for all sectors on the track. Sectors 1, 2, and 3 can then be read consecutively during a single revolution of the disk because the controller has adequate time to process the data received from sector 1 while sector 10 spins beneath the head. The controller is then able to accept data from sector 2 when it spins beneath the head. Likewise, sectors 10, 11, and 12 can be read consecutively during a second revolution of the disk because the controller processes data from sector 10 while sector 2 passes beneath the head and then reads sector 11, and so forth until all desired sectors on the track are read. Thus, it should be understood that sectors arranged in a 2:1 interleave are read consecutively, but reading every sector on a track requires two revolutions of the disk. Similarly, other interleaving techniques can be used. A 3:1 interleave means that consecutively-numbered sectors are separated by two other sectors and requires three revolutions to transfer all sectors on a track.

On standard 3.5-inch floppy diskettes, all tracks contain sectors that are numbered in identical fashion, such that a radial line on the disk cuts through the same sector number on each track, as shown in FIG. 1. When the last sector on a track has been read and the next sector to be read is located on the next cylinder, the head must be moved over the next cylinder.

When a new cylinder on the disk is accessed, the heads, attached to an arm, are moved radially from the current cylinder to the destination cylinder. A certain amount of time is required for the arm holding the heads to overcome the effects of inertia and friction so as to effect its movement. Additional time is required to allow the heads to settle in a stationary position after its movement. Therefore, each access of a new cylinder creates an inherent delay due to the mechanical requirements of moving the heads.

During the time required to move the heads, the disk continues to rotate. Therefore, when the head is located over the new track and is ready to receive data, several sectors may have passed beneath the head such that the first sector to be read on the new track has already passed the head. Thus, the system must wait for the disk to complete a revolution such that the desired sector again passes beneath the head. This causes an undesirable delay and a corresponding degradation in system performance.

Performance can be improved if the sectors on each track are arranged such that the first logical sector on each track is the first sector to pass the head after the head is moved to the track from the adjacent track. Arranging the tracks on the disk in such a manner is called "skewing", which simply means that the sector numbers on adjacent tracks are offset by a predetermined amount. Skewing is commonly implemented on hard disks, but is generally not used on floppy diskettes.

In conjunction with the Microsoft MS-DOS operating system, certain data structures are stored in sectors near the beginning of a floppy diskette for providing information regarding the diskette and the data stored thereon.

The first sector of a floppy diskette contains the Boot Record. The Boot Record contains system boot code and a BIOS Parameter Block (BPB). The BPB contains fields to describe the physical and logical geometry of the diskette. The BPB contains information that describes the characteristics of the drive, including, for example, the number of bytes per sector and the number of sectors per cluster, the number of sectors per track.

The File Allocation Table (FAT) is used to identify whether clusters on the disk are being used to store file data or are unused and therefore available to store data. The FAT file system was created for MS-DOS and is a standard method to organize the sectors on a diskette such that files and subdirectories can be maintained and organized on the diskette. The FAT also identifies the chain of clusters that store data for a given file. The FAT contains one entry for each cluster identified on the disk drive.

Another data structure called the Root Directory includes a list of all files and subdirectories stored on the disk. The Root Directory differs from subdirectories in that the Root Directory is stored near the beginning of the disk prior to sectors used to store file data. Subdirectories are stored in sectors on the disk in the same manner as are files, and the location of each file and subdirectory is maintained in the Root Directory. The Root Directory has an entry, for each file, containing the cluster number in which the first part of that file is stored. By storing the starting cluster number of each file, the Root Directory ties each file to the FAT.

To access a file on the disk, the operating system of the computer reads the Root Directory entry for the file to determine the first cluster number in which file data is stored. The operating system then reads the entire chain of FAT entries starting at the file's first cluster. Using the location of the sectors used to store data for each cluster and the chain of clusters from the FAT, the operating system can determine every cluster belonging to the file and can access all sectors of each cluster.

The remainder of the diskette contains a number of clusters. Each cluster contains an identical number of sectors, as defined in the BPB. Data to be stored on the disk is stored in the sectors that comprise these clusters.

Methods and formats exist for expanding the data storage capacity of floppy diskettes. These methods do not include data compression, which actually reduces the amount of data to be stored on the disk. These methods involve maximizing the amount of storage space on the disk that is allocated to the storage of user file data.

Some prior methods of expanding the storage capacity of floppy diskettes include the use of single-stepping, in which the number of tracks on the disk is doubled. This technique applies only to 5.25-inch high density drives, and only provides a method to store 720 Kb or 800 Kb on low-cost media designed for a capacity of 360 Kb. Additionally, some prior formats have reduced the size of the inter-sector gaps to free up more storage space such that more than eighteen sectors per track are available for data storage. This is shown in FIG. 3, where the inter-sector gap is much smaller than the gaps shown on the standard 3.5-inch floppy diskettes of FIG. 1, such that each track contains twenty sectors. However, increasing the number of sectors per track to twenty requires reducing the gap to such a small size that the ability of the controller to process data from adjacent sectors is impaired. Thus, writing new data to a sector is unreliable because even slight variations in disk rotational speed will likely cause the newly written data to be written over the sector boundary, through the inter-sector gap, and into the next sector, thereby destroying information in the next sector. Also, reducing the gap to such a small size may not allow the controller to process the data from the last sector in time for the next sector to be read. Therefore, the disk must make a complete revolution for the next sector to again pass under the head.

Some prior formats for expanding storage capacity require a device driver to effect the proper access of data on the disk. However, a device driver must be loaded onto the system and thus is intrusive and adds extra expense and effort for the end-user of the system.

All prior formats for expanding the storage capacity of floppy diskettes support the reading of data from, and writing data to, the diskette. Such an approach does not recognize the unique function of mass distribution diskettes, namely, that distribution diskettes will rarely, if ever, be written to by the end-user of the diskette. Thus, all prior methods of increasing storage capacity include allowances for the writing of data to the disk. Such allowances, specifically the large inter-sector gaps, reduce the storage capacity of the diskette.

Floppy diskettes are typically used for one of two purposes. Floppy diskettes may be used by users to store data created by the user, such as word processing documents or spreadsheets. The storing of new data, or the overwriting of old data, on the disk can occur many times.

Another use of floppy diskettes is for the mass distribution of software. Software manufacturers typically ship their software to customers on magnetic floppy diskettes. Most commercially available programs are contained on numerous disks that must be read on the end user's computer. Typically, the customer installs the software on the computer by commanding the computer to read the data contained on the floppy diskettes and storing the needed data on the computer's larger hard disk or network server. Subsequently, the customer has little, if any, need to use the diskettes again. It is extremely uncommon, if not impossible, for customers to write data to these diskettes.

Computer software companies ship hundreds of millions of floppy diskettes every year. Thus, software companies desire to maximize the storage of software on diskettes so as to minimize the number of diskettes required to store each program sold. By minimizing the number of diskettes required to ship software, substantial cost savings can be realized.

SUMMARY OF THE INVENTION

The present invention provides a method and apparatus for storing predominantly read-only data on a floppy diskette. The inventive method provides a Distribution Media Format (DMF) that reduces the inter-sector gap between adjacent sectors on each track to twenty bytes or less, to a minimum of eight bytes. The data storage space gained from the reduction in gap size is used to add additional sectors to each track on the diskette, thereby providing a total of twenty-one sectors per track. Because the gap between sectors is reduced to such a small size, the disk controller may not be able to process the data from one sector before the adjacent sector is to be read. Therefore, sectors are arranged on each track in a 2:1 interleave arrangement, such that one sector separates consecutively-numbered sectors. This interleaving arrangement allows adequate time for the controller to process data from one sector before the next sector passes beneath the head.

Sectors on adjacent tracks are arranged such that the sector that passes beneath the head after the head has been moved to the adjacent track is the first sector on the track. Thus, the sectors on the adjacent track are skewed, such that the beginning of the first sector on the adjacent track is offset from the end of the last sector on the previous track by four sectors.

Additionally, the present invention provides a method by which data can be written by a personal computer to a diskette formatted to provide twenty-one sectors per track. The method includes first formatting a track in accordance with the present invention, then writing data to sectors on the track. Thereafter, the data written to the track is verified to determine whether the data is accurately written. If so, the next track is formatted and the method proceeds as above for each track on the diskette. If the data is determined to be inaccurately written to a track, the track is reformatted in case of any overlap of data into adjacent sectors, and rewritten.

Because the inventive format provides twenty-one sectors as compared to eighteen sectors for standard floppy diskettes, the ROM BIOS of many computer systems may not properly allow access to the additional sectors on each track. Therefore, the present invention provides two ROM BIOS hooks that are subroutines that allow existing ROM BIOS to access all sectors on the inventive DMF diskettes.

One ROM BIOS hook intercepts read requests prior to execution by the ROM BIOS. The method determines the ending sector number of the read request. If the ending sector number exceeds the End-of-Track (EOT) setting stored in the computer that identifies the highest sector number on each track, the method sets the EOT setting to equal the ending sector number. The request is then sent to the ROM BIOS for execution.

A second ROM BIOS hook determines whether a request to read from the floppy diskette has been issued that spans the boundary from sector 18 to sector 19. If so, the method separates the read request into two requests. One request is issued to read from the starting sector number through sector 18. A second request is issued to read from sector 19 through the ending sector number.

Thus, it is an object of the present invention to increase the data storage capacity of floppy diskettes by using a Distribution Media Format (DMF).

It is another object of the present invention to increase the data storage capacity of floppy diskettes via DMF by utilizing twenty-one sectors on each track of the diskette.

It is another object of the present invention to increase the data storage capacity of floppy diskettes via DMF by reducing the inter-sector gap between adjacent sectors on the disk.

It is a further object of the present invention to store data in sectors on a diskette utilizing a 2:1 interleave and a four sector offset between tracks.

It is a further object of the present invention to store data on an expanded capacity, read-only floppy diskette that does not support standard disk writing capability.

It is a still further object of the present invention to provide a method for personal computers to write data to the DMF diskette.

It is a further object of the present invention to provide a method by which all sectors on DMF diskettes can be accessed by existing ROM BIOS.

Other objects, features, and advantages of the present invention will become apparent upon reading the following specification, when taken in conjunction with the drawings and the appended claims.

BRIEF DESCRIPTION OF THE DRAWINGS

FIG. 1 is a graphical representation of the arrangement of sectors on a standard 3.5-inch, 1.44 Mb capacity floppy diskette.

FIG. 2 is a table identifying the allocation of bytes for each sector on a floppy diskette.

FIG. 3 is a graphical representation of the arrangement of sectors on a prior expanded capacity floppy diskette.

FIG. 4 is a block diagram of a computer system on which the present invention is implemented.

FIG. 5 is a graphical representation of the arrangement of sectors on a DMF diskette in accordance with the present invention.

FIG. 6A is a table identifying the allocation of bytes for each track on a DMF diskette.

FIG. 6B is a table identifying the allocation of bytes for each track on a standard 3.5-inch, 1.44 Mb capacity floppy diskette.

FIG. 7A is a table identifying the entries contained in the Boot Record data structure maintained on a DMF diskette.

FIG. 7B is a table identifying the entries contained in the Boot Record data structure maintained on a standard 3.5-inch, 1.44 Mb capacity floppy diskette.

FIG. 8A is a graphical representation of improperly written data spanning the inter-sector gap on a DMF diskette.

FIG. 8B is a graphical representation of improperly written data that does not span the inter-sector gap on a standard 3.5-inch, 1.44 Mb capacity floppy diskette.

FIG. 9 is a flow chart showing the method by which data is written to a DMF diskette by a personal computer.

FIG. 10 is a flow chart showing the method of the first ROM BIOS hook routine.

FIG. 11 is a table showing the result of read requests for various groups of sectors on a DMF diskette as required on computers that require the second ROM BIOS hook routine shown in FIG. 13.

FIG. 12 is a table showing the separation of the read requests of FIG. 11 in accordance with the second ROM BIOS hook routine.

FIG. 16 a table identifying the allocation of bytes for each sector on a floppy diskette in accordance with the 1.25 Mb standard.

FIG. 17 is a table identifying the allocation of bytes for each track on a DMF diskette in an alternative embodiment of the present invention.

FIG. 18 is a table identifying the allocation of bytes for each track on a 3.5-inch diskette in accordance with the 1.25 Mb standard.

FIG. 19 is a table identifying the entries contained in the Boot Record data structure maintained on a DMF diskette in an alternative embodiment of the present invention.

FIG. 20 is a table identifying the entries contained in the Boot Record data structure maintained on a 3.5-inch floppy diskette in accordance with a 1.25 Mb standard.

DETAILED DESCRIPTION OF THE PREFERRED EMBODIMENT

Figure 13:
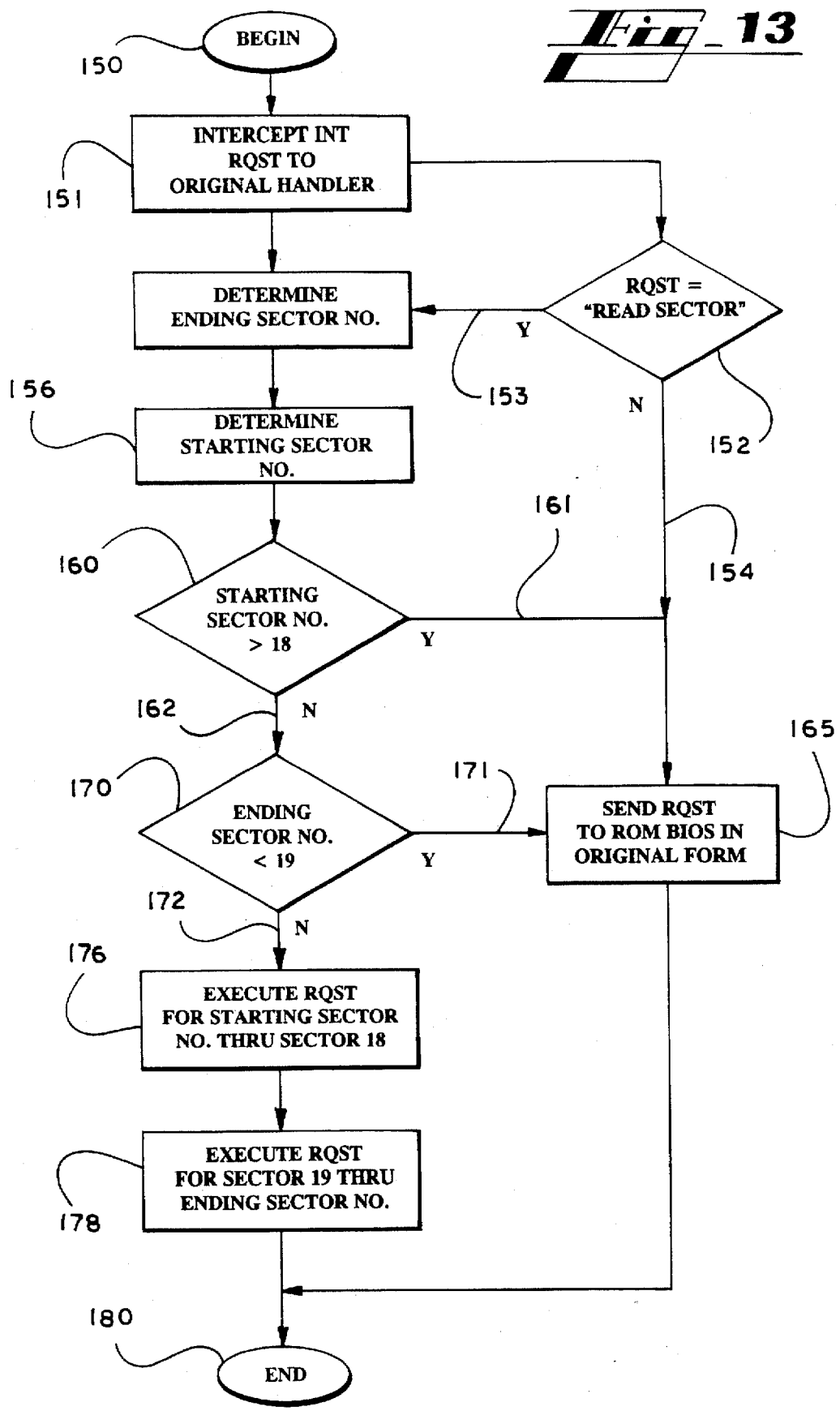
FIG. 13 is a flow chart showing the method of the second ROM BIOS hook routine.

Turning next to the figures, the preferred embodiment will now be described in detail. The method of the present invention is useful in connection with a computer system that formats and stores data on an expanded capacity 3.5-inch floppy diskette.

In general, the preferred embodiment provides an improved method and format for providing an expanded capacity floppy diskette on which to store data. The inventive format for the expanded capacity diskette is called Distribution Media Format (DMF) and provides small inter-sector gaps of twenty bytes or less, with a minimum of eight bytes, between each sector on each track, thereby freeing up sufficient track space to provide twenty-one sectors per track. To compensate for the disadvantages associated with small inter-sector gaps, the inventive format arranges sectors on each track using a 2:1 interleave to allow the disk controller adequate time to process data from each sector before data from the next sector is read. Additionally, the present invention offsets the first and last sector on adjacent tracks by four sectors to allow the first sector on the next track to be the first sector to pass beneath the head after reading the last sector of the adjacent track and the head is repositioned over the next track.

Because the sectors on each track are separated by a small eight byte gap, writing to an individual sector is unreliable because potential variations in the disk rotation speed caused by the disk drive motor may cause data written to one sector to overlap an adjacent sector, thereby corrupting adjacent sector data. Thus, the method and format of the present invention is to be utilized preferably with a read-only floppy diskette. However, the present invention also provides a method by which a personal computer can write data to a DMF diskette without corrupting other data on the diskette.

As shown in FIG. 4, the format and method of the present invention is implemented on a computer system, generally shown at 40, comprising a computer 42 having a central processing unit (CPU) 44, a memory 45 including an operating system 46, an application program 48, a handler 49, and a ROM BIOS 50 for providing low-level routines for performing input/output operations. The computer 42 also includes a floppy disk drive 52 and a disk drive controller 54 for directing and controlling the reading from and writing to the floppy disk drive. The disk controller 54 handles such tasks as positioning the head, mediating between the disk drive and the CPU, and controlling the transfer of information to and from the memory of the computer. Each diskette request issued by the operating system 46 is presented to the computer system's ROM BIOS via a software interrupt. The handler 49 intercepts these interrupts and provides small computer programs to manipulate the request to facilitate input/output operations in accordance with the present invention.

The inventive format for providing an expanded capacity diskette is best understood by referring to FIG. 5, which shows a diskette, generally shown at 50, formatted in accordance with the present invention. Because the expanded capacity diskette formatted in accordance with the present invention is preferably utilized for mass distributions of software, the expanded capacity diskette shall hereinafter be referred to as a "DMF diskette".

The data storage area on the DMF diskette 50 is arranged in concentric rings called tracks. DMF diskettes, as well as standard 1.44 Mb diskettes, have 80 tracks on each side of the disk. The tracks are numbered beginning from the outer edge of the disk such that the outermost track is identified as track 0 and the innermost track is identified as track 79. Thus, in FIG. 5, the track identified by reference numeral 52 is track 0 and the track identified by reference numeral 54 is track 1. For convenience, the DMF diskette of FIG. 5 shows only five tracks.

The allocation of bytes on each track of a DMF diskette and a standard 1.44 Mb diskette are defined in the tables of FIGS. 6A and 6B, respectively. With the exception of a start-of-track gap and an end-of-track gap, all bytes of each track are allocated to either sectors or inter-sector gaps. The inter-sector gap of a DMF diskette has preferably been reduced to a minimum of only 8 bytes as compared to the 101 byte gap of standard 1.44 Mb diskettes. This reduction in gap size frees up enough bytes to allow each track to contain twenty-one sectors. The additional three sectors allocated to data storage rather than to gaps increases the data storage capacity of the DMF diskette to 1.68 Mb (1680 kilobytes), nearly a 17 percent increase in capacity over standard floppy diskettes.

The effect of the allocation of bytes on each track is also shown in FIG. 5, where the DMF diskette is shown with twenty-one sectors per track. For convenience, the following discussion will refer to those bytes in track 0, but it should be understood that the description is equally applicable to all tracks on the diskette.

FIG. 5 is drawn roughly to scale. The start-of-track gap is shown at 56 and the end-of-track gap is shown at 58. The remainder of the track contains twenty-one sectors and twenty inter-sector gaps. The narrow lines 60 between sectors roughly approximate the size of the gaps compared to the size of the sectors. When compared to the standard 1.44 Mb diskette and prior expanded capacity diskettes, shown in FIGS. 1 and 3, respectively, the size of the gaps of the DMF diskette is dramatically reduced. This reduction in gap size to eight bytes frees enough storage space on each track to allow the DMF diskette to contain an additional three sectors per track as compared to standard 1.44 Mb diskettes.

Each sector on the diskette includes several fields. The allocation of bytes within each field of each sector is shown in FIG. 2. The first four fields, comprising twenty-two bytes, are used to store address information for the sector. The largest percentage of each sector, 512 bytes, is used to store data. It should be understood that the allocation of bytes within each sector is identical for both DMF diskettes and standard 1.44 Mb diskettes.

Because the inter-sector gaps of the present invention, shown at 60 in FIG. 5, are so small and because the diskette spins so rapidly, the disk controller may not have sufficient time to process all of the data read from one sector before the next sector to be read passes beneath the head. Therefore, the disk controller may not detect the address of the next sector from which data is to be read. If adjacent sectors are to be read consecutively, the disk controller may read the data of one sector but not be able to identify the next adjacent sector as it spins beneath the head. If this occurs, the disk controller must wait for the adjacent sector to again pass beneath the head. Then the disk controller identifies the second sector and reads the data from that sector. However, this requires a complete revolution of the diskette and wastes time.

Although the inter-sector gap of the preferred embodiment described herein is defined as 8 bytes, the DMF format of the present invention supports inter-sector gaps up to 20 bytes. Any gap size of 20 bytes or less is sufficiently small to allow twenty-one sectors per track, in accordance with the inventive format. It should be understood that inter-sector gaps of up to 20 bytes are still so small that any disadvantages caused thereby and the corresponding solutions described herein, as applied to a diskette having 8 byte gaps, are equally applicable to a diskette having inter-sector gaps of up to 20 bytes.

A diskette having 20 byte gaps may still contain twenty-one sectors per track. Because a track having twenty-one sectors has twenty inter-sector gaps, the number of bytes devoted to inter-sector gaps increases when the size of the gap is increased from 8 bytes to 20 bytes. For a maximum gap size of 20 bytes, the track requires that 240 additional bytes be allocated for inter-sector gaps.

These additional bytes can be obtained from several sources. The start of track gap and end of track gap on each track are relatively large. As seen in FIG. 6A for a track using 8 byte gaps, the start of track gap is 80 bytes and the end of track gap is 206 bytes. These gaps can be reduced in size without adversely affecting the operation of the diskette such that bytes previously allocated to the start of track gap and end of track gap can be allocated instead to increasing the inter-sector gaps up to 20 bytes. Additional bytes can be obtained by reducing the size of "Gap2", as seen in FIG. 2, from 22 bytes to 18 bytes. For a track having twenty-one sectors, 84 bytes (4 bytes per sector×21 sectors per track) can be obtained by reducing "Gap2" for each sector on the track. It should therefore be understood that a sufficient number of additional bytes can easily be obtained by reducing the start of track gap, end of track gap, and "Gap2" in each sector to allow each inter-sector gap to be up to 20 bytes.

Preferably, data is read from consecutively-numbered sectors on a track. Thus, because of the small gap and the problems caused thereby, as discussed above, the sectors on a DMF diskette are arranged in a 2:1 interleave pattern. Thus, consecutively-numbered sectors are not located adjacent to one another on the track. This is shown in FIG. 5, where sector 2 is separated from sector 1 by one other sector, sector 3 is separated from sector 2 by one other sector, and so forth for every sector on the track. The interleaving of sectors on the DMF diskette allows the disk controller adequate time to process the data read from one sector before the next sector to be read passes beneath the head. For instance, if sectors 2 and 3 are to be read consecutively, the head first encounters sector 2. After the contents of sector 2 have been read, the disk controller processes the data. Because a very small gap exists between the sectors, the processing of data from sector 2 continues as sector 13 passes beneath the head. While sector 13 passes the head, the disk controller has sufficient time to process the data from sector 2 and then begins to search for sector 3. When sector 3 passes the head, the disk controller is able to identify the address data of sector 3 and then to read the contents of sector 3. In this manner, consecutively-numbered sectors on a DMF diskette can be read consecutively.

However, arranging sectors on the diskette in an interleaved pattern causes a degradation in performance. For example, a 2:1 interleave has consecutively-numbered sectors separated by one other sector. Therefore, for consecutively-numbered sectors to be read, the first sector is read, then an unread sector passes, then the second sector is read. It should therefore be understood that for every sector on a track to be read, two revolutions of the disk are required. Referring to FIG. 5, sectors 1 through 11 would be read during the first revolution of the diskette and sectors 12 through 21 would be read during the second revolution of the disk. Because two revolutions are required to read an entire track compared to only one revolution to read a track for standard, non-interleaved diskettes, as shown in FIG. 1, the DMF diskette suffers from up to a 50 percent reduction in performance due to the 2:1 interleaving of sectors.

Frequently, the contents of a file are contained both on the last sectors of one track and the beginning sectors of the next track. If the sectors of each track were arranged identically, then the first sector of the next track would not be able to be sequentially read after the last sector on the previous track because of the delay inherent in the movement of the head from the previous track to the next track. The head movement may take only a fraction of a second, but the floppy diskette is spinning rapidly. Therefore, by the time the head is in place and ready to identify a sector and receive data, several sectors on the next track have passed the head. Therefore, the head must wait for the desired sectors to again rotate beneath the head. This creates a delay that degrades performance.

After the last sector on a track is read, the head is moved to the next track. The time required for the head to move to an adjacent track and begin to read data is on the order of 0.03 seconds, during which time the disk rotates approximately one-sixth of a revolution. During this time, just under four sectors spin past the head.

A standard 1.44 Mb floppy diskette, as shown in FIG. 1, is formatted such that there are no intervening sectors between the location of the first sector on an adjacent track and the last sector of the previous track. Sector 1 on track 1 is adjacent to sector 18, the last sector on track 0. Therefore, for standard floppy diskettes, the first few sectors of the next track spin unread beneath the head while the head is being moved to the next track. For the first sector on the next track to be read, the controller must wait for the first sector to spin around to the head, which requires nearly a full revolution of the diskette. Therefore, standard floppy diskettes suffer a degradation of performance when data from a new track is read.

To solve this problem, the DMF diskette places four intervening sectors between the last sector on a track and the first sector on the next adjacent track. Therefore, the first sector on track 1 is separated from the last sector on track 0 by four intervening sectors. This is shown in FIG. 5 where sector 21, identified as reference numeral 62, is the last sector on track 0, and sector 1, identified as reference numeral 64, is the first sector on track 1. The beginning of sector 1 on track 1 is offset from the end of sector 21 on track 0 by four sectors. Referring to FIG. 5, while the head is moving from track 0 to track 1 the following sectors on track 1 spin past the head unread: sector 20, sector 10, sector 21, and sector 11. As sector 11 spins beneath the head, the head reaches position and is ready to read data from the diskette. The sector that immediately follows sector 11 is sector 1, which contains the first data to be read on track 1. Sector 1 then spins beneath the head and is identified and read.

This four sector offset allows the head sufficient time to be moved from track 0 to track 1 before the first sector to be read passes the head. Thus, the head can begin reading the data from sector 1 on track 1 with much less delay. In general, the four sector offset used on DMF diskettes provides about a 19 percent improvement in performance compared to a DMF diskette that does not utilize an offset.

The 19 percent improvement achieved using the four sector offset is illustrated in the following manner. A DMF diskette that does not use the four sector offset in accordance with the present invention requires five revolutions of the disk to read a cylinder, i.e., the two tracks on opposite sides of the disk. Each track on the disk takes two revolutions to be read because of 2:1 interleaving. The head must be moved to the next cylinder, which means the head must wait for the disk to complete an entire revolution for the first sector on the next cylinder to pass the head. Then the actual data is read during two revolutions of the disk because of the 2:1 interleave pattern of the sectors on each track. Thus, each cylinder requires five revolutions of the disk to be completely read. When the next track is to be read, the head must be moved and the disk must again complete an entire revolution for the first sector to pass the head. For all 80 cylinders on the disk to be read requires 400 revolutions of the disk. Because the disk spins at approximately 300 rpm, 80 seconds are required for an entire DMF diskette to be read.

By contrast, a DMF diskette using a four sector offset between sectors on adjacent tracks requires only approximately 2.1 revolutions of the disk for each track to be read. When the head is moved to the next track, the disk rotates a portion of a revolution before the first sector on the track is read. By offsetting the sectors on each track, the head need not wait for the disk to make a complete revolution in order for sector 1 to pass beneath it. Thus, approximately 4.2 revolutions of the disk are required for each cylinder to be read. For all 80 cylinders on the disk to be read requires 335 revolutions, taking 67 seconds. Therefore, a DMF diskette with a four sector offset gains approximately a 19 percent improvement in performance over a DMF diskette that does not use a four sector offset.

It should be noted from FIG. 1 that the sectors on standard 1.44 Mb diskettes are arranged on each track in exactly the same manner. Thus, if a radial line were to be drawn from the center of the diskette to the outside of the diskette, the line would cross the same sector number on each track. Thus, the first sector is adjacent to the last sector of the previous track. Such an arrangement does not provide the performance advantages obtained from the four sector offset of the inventive format.

For purposes of comparison, it should be understood that the data stored on an entire 1.44 Mb diskette can be read in 48 seconds. It should be understood that the format of a standard 1.44 Mb diskette does not use an interleave arrangement and, furthermore, does not use an offset, because the first sector on each track is adjacent to the last sector on the previous track, and thus is not separated by any intervening sectors. Therefore, three revolutions of the disk are required for each cylinder to be read. One revolution is required to allow the head to move to each new cylinder and one revolution is required for the data on each track to be read. Thus, all 80 cylinders on a standard diskette are read in 240 revolutions taking 48 seconds.

Because a standard 1.44 Mb diskette is read in 48 seconds and a DMF diskette is read in 67 seconds, it appears that the DMF diskette suffers a comparative degradation in performance. However, the total number of bytes read from each disk must also be considered. Because standard diskettes contain 1.44 Mb of data that is read in 48 seconds, floppy disk drives read 30 kilobytes (Kb) per second from standard format diskettes. By contrast, DMF diskettes contain 1.68 Mb (1680 kilobytes) of data that is read in 67 seconds. Therefore, floppy disk drives read 25 Kb per second from DMF diskettes. Although DMF diskettes require more time to be read, the rate of transfer of data is very close to standard diskettes. Of course, because more data can be stored on each DMF diskette and considering the amount of time required for the user to exchange diskettes, fewer diskettes are required to transfer equal amounts of data in essentially an equal amount of time.

The differences between the inventive DMF diskettes and standard 1.44 Mb diskettes also relate to the size and entries of the various data structures stored near the beginning of the disk. Sector 1 on each floppy diskette is the Boot Record. Tables showing the contents of the Boot Record for a DMF diskette and a 1.44 Mb diskette are shown in FIGS. 7A and 7B, respectively. The Boot Record contains boot code in its first three bytes and an OEM ID in its next eight bytes. The OEM ID entry for a DMF diskette is different than the entry for a 1.44 Mb diskette. The OEM ID entry for a DMF diskette can be recognized by certain software so that certain computer systems can be aware that the floppy diskettes in use on the system are formatted in accordance with the present invention. By recognizing the floppy diskettes as DMF diskettes, the operating system may be able to prevent the writing of data to the diskette to avoid potential accidental destruction of data.

The next twenty-five bytes contain BPB entries. These BPB entries describe the characteristics of the floppy diskette and drive. Several entries in the BPB for a DMF diskette are different than corresponding entries for standard 1.44 Mb diskettes. In particular, as compared to standard diskettes, the inventive DMF format increases the number of sectors per cluster from one to four, decreases the number of root directory entries from 240 to sixteen, increases the total number of sectors from 2880 to 3360, decreases the size of the FAT from nine sectors to three, and increases the number of sectors per track from eighteen to twenty-one.

Not only do DMF diskettes increase the data storage capacity of a floppy diskette, but the inventive format also frees up additional space for data storage by reducing the size of the FAT and Root Directory.

For the purposes of recording the location of file data on the disk, the FAT includes an entry for each cluster on the disk. A cluster is a grouping of a predetermined number of sectors. It should be understood that this grouping is not a physical or magnetic definition of space on the disk, but is a virtual grouping performed by the operating system. Because DMF diskettes have four sectors per cluster as compared to standard diskettes that have one sector per cluster, the number of clusters on the diskette is reduced fourfold. Therefore, fewer entries are required in the FAT, and the size of the FAT on DMF diskettes is correspondingly reduced. With reference to FIGS. 7A and 7B, the number of sectors required to store the FAT is reduced by six sectors. This frees up additional space that increases the capacity of the DMF diskette.

The Root Directory contains an entry for each file stored on the disk. Most diskettes, especially those that allow end-users to write their own files to the disk, contain many files. Therefore, a large amount of space must be allocated in the Root Directory to allow these entries.

However, DMF diskettes contain only a very small number of files. Consequently, the number of entries required in the Root Directory is reduced, and the size of the Root Directory is correspondingly reduced. With reference to FIGS. 7A and 7B, the number of Root Directory entries is reduced from 240 to sixteen. The disk storage space freed up by this reduction of entries can then be allocated to the storage of data. The combined effect of more sectors and reduced system area yields an increase from 2847 sectors to 3352 sectors, an increase of almost 18 percent.

High speed duplicator machines, which are used in the production of disks for commercial software distribution, write both the track formatting information as well as the track data in a single pass over the diskette. A standard PC floppy diskette controller, by contrast, cannot execute this single pass format and write. Therefore, writing to DMF diskettes on a PC requires that each track be formatted, then written to, and then verified. The verification step is necessary because it is possible that small variations in the speed at which the diskette is rotated could cause the writing of data to damage the sector formatting information at the beginning and end of each sector. If the verification step fails, the entire track must be formatted again, then written to again, and verified until the verification is successful. After proper verification occurs, the next track can be formatted.

By contrast, PCs writing data to standard 3.5-inch diskettes do not reformat the track when data written to the diskette has not been properly verified. PCs format the entire diskette in accordance with the standard 3.5-inch diskette, then write the data to the sectors on the diskette. The data is then verified. If the data is not properly verified, the PC does not reformat the entire track, as occurs when writing to a DMF diskette. If the data is not properly verified, the PC will merely rewrite the data to the diskette rather than reformatting the track. If data written to a DMF diskette by a PC is not verified, then the entire track must be reformatted because the non-verification means that the data is not completely contained within the appropriate sector, and that the data probably extends into the adjacent sector, thereby destroying the formatting data stored at the beginning of the adjacent sector. Thus, it is clear that merely rewriting the data to the DMF diskette will not correct the corrupted formatting data caused by the flawed writing. Therefore, the entire track is reformatted in accordance with the inventive format and the data is written again to be subsequently verified.

The data initially written to DMF diskettes for distribution is performed by a high speed duplicator. A duplicator is a sophisticated piece of equipment for writing identical data onto a large number of diskettes. The process by which these duplicators operate allow them to write data onto DMF formatted diskettes. However, the slight variations in disk rotation speed of floppy disk drives on personal computers prevents personal computers from reliably writing data to DMF diskettes without the possibility of corrupting data stored in the address field or data field of the following sector.

This is best seen by referring to FIGS. 8A and 8B. If data written to a sector on a DMF diskette in FIG. 8A extends beyond the sector boundary, then the data may cross the small inter-sector gap and corrupt the data in the following sector. If this occurs, then the following, sector cannot be accessed because the address data has been destroyed, and the data stored in the following sector is lost.

Such is not the case with standard floppy diskettes, as shown in FIG. 8B. If date written to the disk extends beyond the sector boundary, the data is not likely to extend into the following sector because the data is contained within the large inter-sector gap. Thus, the data of the following sector remains intact.

Due to the potential problems inherent in writing data to a DMF diskette, as described above, it is preferred that DMF diskettes be read-only, such that data is not written to DMF diskettes by machines other than disk duplicators. However, the present invention provide, a method whereby data can be reliably written to a DMF diskette by a PC. The method is described in the flow chart of FIG. 9.

The method consists of a software routine for use in conjunction with the ROM BIOS for writing data to the DMF diskette. The method for a PC to write data to a DMF diskette begins at step 90. At step 91, cylinder 0 is accessed and head 0 is selected. At step 92, a trick is formatted into twenty-one sectors with small gaps between each sector of 20 bytes or less, but preferably eight bytes, n accordance with the DMF format described above. At step 94, data is written to the sectors of the track. After the data is written to the sectors in the track, the data is read from the sectors. A step 100, the data is verified, i.e., it is determined whether the data has been properly written to each sector. If the data has been verified, the method follows "yes" branch 101 to step 105, where it is determined whether additional data is to be written to another track on the DMF diskette. If no additional data is to be written to another track, the method follows "no" branch 107 and the method terminates at 110. If additional data is to be written, as determined at step 105, the method follows "yes" branch 106 to step 108. At step 108, the drive switches to the opposite head associated with the opposite side of the diskette. At step 110, the heads are moved to the next track if head 0 is selected where data is to be written and the method then returns to step 92.

If, however, it is determined at step 100 that the data written to the sectors of the track has not been verified, then the method follows "no" branch 102 and returns to step 92, where the track is re-formatted. It should be understood that on DMF diskettes the unverified data cannot merely be re-written to the appropriate sector because of the possibility that the data has spanned the inter-sector gap and corrupted data stored in the following sector. By re-formatting the entire track and then re-writing the data to the entire track, the present method ensures that any sector on the track that had been corrupted by the prior write operation is re-formatted with the proper address information and re-written with the proper data.

One advantage of the present invention is that the retrieval of data from a DMF diskette does not require the use of an additional device driver. The retrieval of data from a disk formatted in accordance with the present invention can be accomplished using standard disk controller cards in existing computer systems. Thus, the retrieval of data from DMF diskettes does not require additional intrusive and burdensome hardware or software. It is desirable to utilize the ROM BIOS to access the diskette to avoid numerous variations in the implementations in "industry-standard" PC's.

When data is to be read from the diskette, the operating system sends a request to the ROM BIOS, which is a set of routines that work with system hardware to support the transfer of information from the diskette.

However, the routines of the ROM BIOS may only support the transfer of data from a floppy diskette formatted in accordance with standard 3.5-inch diskettes. The ROM BIOS recognizes an End-of-Track (EOT) setting derived from the "sectors per track" entry in the BPB and stored in the computer. The EOT setting is used to support a multi-track feature that allows a single command to transfer data from both heads of a floppy diskette drive. However, the multi-track feature is not supported in all ROM BIOS, so operating systems break up read commands into single-track operations.

The EOT setting is supplied to the diskette controller during execution of a read or write command and identifies the highest sector number that appears on each track. If the EOT setting is set to a value less than the actual number of sectors per track, the diskette controller will not transfer data from sector numbers higher than the EOT setting. For standard 3.5-inch floppy diskettes, there are eighteen sectors per track, and thus the EOT setting recognized by the Operating system is eighteen. Therefore, the operating system identifies sector 18 as the last sector on each track. Any request to real sectors 19, 20, or 21 will result in an error.

The solution to this problem is to provide a ROM BIOS hook, i.e., a software routine provided by a handler operationally connected to the ROM BIOS. The hook routine sets the EOT setting to a sufficiently large value such that a request to read sectors 19, 20, or 21 is properly executed. The method is shown in the flow chart of FIG. 10. The ROM BIOS hook is temporarily installed by he software product's SETUP program and is removed after SETUP.

Each read request to the floppy drive issued by the operating system is presented to the ROM BIOS via a software interrupt, at which point the method of the present invention begins at 120. The interrupt request is intercepted by the handler at step 122. The method then proceeds to step 124 where it is determined whether the interrupt request is to read a sector on the floppy diskette. If the request is one other than to read a sector, the method follows "no" branch 126, and the method passes the request to the ROM BIOS at step 136. If the request is to read a sector, the method follows "yes" branch 125 to step 128.

At step 128, the hook routine in the handler determines the ending sector number of the request, i.e., the highest sector number to be read. At step 130, the hook routine determines whether the ending sector number is greater than the current EOT setting. If not, the method follows "no" branch 132, and the method passes the request to the ROM BIOS at step 136. If it is determined that the ending sector number is greater than the EOT setting, which occurs when sectors 19, 20, or 21 are to be read, the method follows "yes" branch 131 to step 134.

At step 134, the hook routine in the handler sets the EOT setting equal to the ending sector number. In this manner, subsequent requests to read high sector numbers will be properly processed. Then, at step 36, the request that was intercepted by the handler is sent to the ROM BIOS, which effects the transfer of data in accordance with the request.

It should be understood that the method of FIG. 10 allows the system to read the data from the additional sectors, i.e., sectors 19, 20, or 21, that are not recognized by the operating system.

Some ROM BIOS implementations ignore the EOT setting. These implementations supply their own internal EOT setting to the diskette controller that does not recognize sectors 19, 20, and 21 and thus does not allow these sectors to be accessed in certain situations. Because the internal EOT setting is generally set to 18, corresponding to the number of sectors on each track of a standard floppy diskette, operations that attempt to continue from sector 18 to sector 19 will fail or, worse yet, return data from another track on the diskette and report no error. If the operation concludes before reaching sector 19, or if the operation begins on sector 19 or higher, the operation will be executed properly. An example of commands to read various groups of sectors, and the results thereof, is shown it the table of FIG. 11. All commands to read data from sector 18 and then from at least sector 19 will fail, while all other commands will pass.

The solution to this problem is to provide another ROM BIOS hook that detects a read/write request to the floppy diskette. The hook routine breaks the request to read sectors on the diskette into two separate requests, as shown in the table of FIG. 12. Requests that continue from sector 18 to sector 19 are broken into two requests. The first request is directed to sectors 1–18, and the second request is directed to sectors 19–21. It should be understood that the first request need not be made prior in time to the second request, and that the second request can be executed prior to the first request. In this manner, every request to read from sectors 19–21 is executed and is not identified as an error, as would occur in standard ROM BIOS implementations.

The method is described in the flow chart of FIG. 13 and begins at 150. The method proceeds to step 151, where the interrupt request to the ROM BIOS is intercepted by the handler. At step 152, the hook routine determines whether the request is to read a sector. If the request is to read a sector, the method follows "yes" branch 153 to step 155, where the hook routine determines the ending sector number of the request. If the request is not to read a sector, the method follows "no" branch 154 to step 165.

At step 156, the hook routine determines the starting sector number of the request. At step 160, the method determines whether the starting number is greater than 18. If so, the method follows "yes" branch 161 to step 165, where the request is sent in original form to the ROM BIOS for execution. If the starting sector number is not greater than 18, the method follows "no" branch 162 to step 170.

At step 170, it is determined whether the ending sector number is less than 19. If so, the method follows "yes" branch 171 to step 165, where the request is sent to the ROM BIOS for execution. If the ending sector number is not less than 19, the method follows "no" branch 172 to step 176.

It should be Understood that all requests that continue from sector 18 to at least sector 19 are identified by steps 160 and 170. Therefore, the only requests that proceed to step 176 are those that span sector 18 to sector 19. All other requests are passed to step 165, where the original request is not broken into two requests and is sent to the ROM BIOS.

At step 176, a first request is issued and executed for the starting sector number through sector 18. At step 178, a second request is issued and executed for sector 19 through the ending sector number. It should be understood that the first request need not be issued and/or executed prior to the second request and that the second request may be issued and/or executed prior to the first request. Thus, steps 176 and 178 may be interchanged without affecting the results of the method shown in FIG. 13. The method then terminates at 180.

In summary, the format and method of the present invention increases the data storage capacity of 3.5-inch floppy diskettes. The format reduces the size of each inter-sector gap to free up enough disk space to allow twenty-one sectors per track. The numbering of the sectors on each track is done so as to optimize the continuous data-transfer rate. Because small inter-sector gaps make writing data to DMF diskettes unreliable, DMF diskettes are preferably read-only disks. Although this appears to be a disadvantage, it should be understood that a primary use of DMF diskettes is for mass distribution of computer software. Such diskettes that contain distribution software are typically read once by end-users, but are rarely written to.

Even though DMF diskettes are preferably read-only, the present invention provides a method by which data can be written to the diskettes by personal computers. The method provides that a track is first formatted, data is written to the sectors of the track, and then the data is verified. If the data is determined to not be properly stored in the sectors of the track, the entire track is re-formatted and the data is again written to the track. This method ensures that the data is properly stored in all sectors of the track.

The present invention also provides methods by which the additional sectors on each track of a DMF diskette can be accessed by the operating system. One method adjusts the EOT setting that the system uses to determine the last sector on each track to allow the additional sectors to be accessed. Another method breaks read requests into two smaller requests such that the additional sectors can be properly read.

The 1.68 Mb capacity diskette described herein illustrates the application of the inventive DMF concepts to the current industry-standard media formats, the 1.44 Mb format for MS-DOS. An alternative embodiment of the present invention, described below with reference to FIGS. 14–20 illustrates the application of the same concepts applied to an alternative media format, the 1.25 Mb format widely used in foreign markets. Application of the inventive concepts to this alternative format expands the data storage capacity of a floppy diskette to 1.38 Mb.

Figure 14:
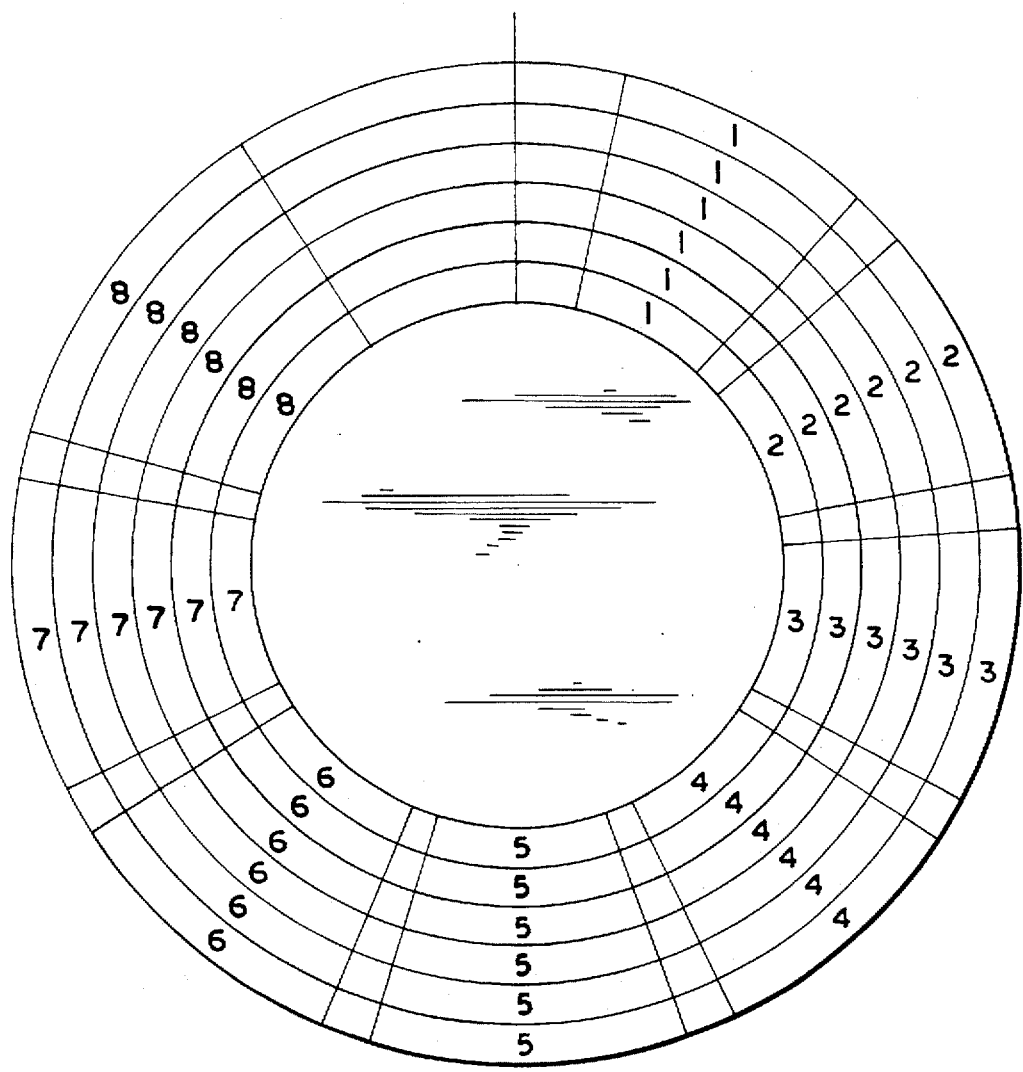
FIG. 14 is a graphical representation of the arrangement of sectors on a 3.5-inch diskette formatted in accordance with a 1.25 Mb standard.

The 1.25 Mb standard uses eight 1024 byte sector per track, and contains only 77 cylinders. The spindle rotates 1.25 Mb diskettes at 360 rpm. A diskette formatted in accordance with the 1.25 Mb standard is shown in FIG. 14. It is seen that each track of the 1.25 Mb diskette has only eight sectors with large inter-sector gaps therebetween.

The DMF concepts applied to the alternative 1.25 Mb format, as described herein, incorporate many of the considerations of the 1.68 Mb DMF diskette as discussed above with reference to FIGS. 1–13. Therefore, much of the description of 1.68 Mb DMF diskettes above is equally relevant to the 1.38 Mb DMF diskettes described herein.

The 1.25 Mb format is better described in FIGS. 16 and 18. The table of FIG. 16 reveals that each sector of the 1.25 Mb diskette contains 1086 bytes and includes a field of 1024 bytes allocated for storing data. By comparison, a diskette formatted in accordance with the 1.44 Mb standard discussed above contains only 574 bytes and include a field that allocates only 512 bytes for storing data, as seen in the table of FIG. 2. Thus, each sector of the 1.25 Mb format is much larger than the sectors used in the 1.44 Mb format.

FIG. 18 describes the allocation of bytes for each track of a 1.25 Mb diskette. It is seen that each track includes only eight sectors separated by inter-sector gaps of 128 bytes. The 1.25 Mb diskette also includes a start of track gap of 146 bytes and an end of track gap of 687 bytes.

FIG. 17 identifies the allocation of bytes for each track of the inventive DMF diskette. Thus, each sector on the inventive DMF diskette includes 1086 bytes, but the inter-sector gaps have reduced from 128 bytes to 36 bytes. Additionally, the end of track gap has been reduced from 687 bytes to 209 bytes. These bytes freed up by the inventive DMF format are used to add one sector to each track of a 1.25 Mb diskette, thereby providing nine sectors per track.

Figure 15:
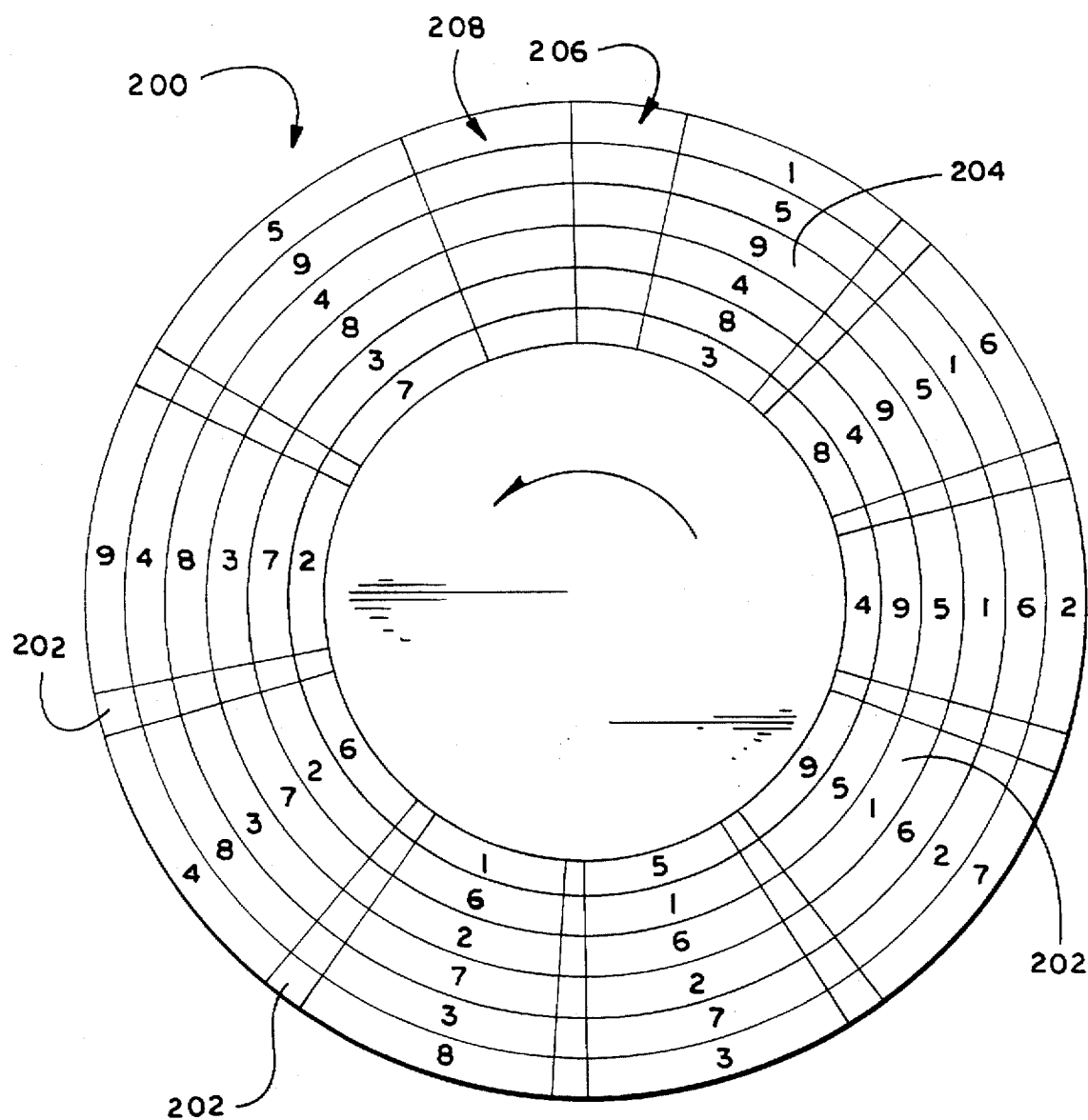
FIG. 15 is a graphical representation of the arrangement of sectors on a DMF diskette in an alternative embodiment of the present invention.

As seen in FIG. 15, the inventive DMF diskette 200 includes nine sectors per track. Between sectors are inter-sector gaps 202. These inter-sector gaps of 36 bytes are larger than the eight byte gaps of the 1.68 Mb DMF diskette shown in FIG. 5. A larger gap is required to accomodate the faster speed at which diskettes are spun within floppy drives in accordance with the 1.25 Mb standard utilized in foreign markets.

Because the inter-sector gaps 202 are small, the sectors on the DMF diskette are arranged on each track in a 2:1 interleave pattern. However, the first sector on each track is offset from the last sector on the previous track by only two sectors. An example of the two sector offset is shown in FIG. 15 in that sector 1, as identified by reference numeral 202, on one track is offset from the last sector 9 on the previous track, identified by reference number 204, by two sectors. This is different than the four sector offset used by 1.68 Mb DMF diskettes because the size of each sector on 1.25 Mb diskettes is nearly twice as large as sectors on 1.68 Mb diskettes. Therefore, a two sector offset is sufficiently large to allow the disk controller adequate time to process data retrieved from each sector before the next consecutively-numbered sector passes the head to be read.

A start of track gap 206 and an end of track gap 208 are included on the DMF diskette of FIG. 15. The same file system optimization is used on the DMF diskette of FIG. 15 as with 1.68 Mb diskettes, as seen with reference to FIGS. 19 and 20, thereby freeing additional bytes for data storage and increasing the data storage capacity of the inventive DMF diskette to 1.38 Mb (1380 kilobytes). Specifically, the number of sectors per cluster has been increased form one to two, the number of root directory entries has been reduced from 192 to 32, and the number of sectors per track has been increased from eight to nine. The combined effect of more sectors and reduced system area yields an increase from 1232 sectors for a 1.25 Mb diskette to 1386 sectors for the inventive DMF diskette.

From the foregoing, it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and way of constructing other embodiments of the present invention will suggest themselves to practitioners of the art. Therefore, the scope of the present invention is to be limited only by the claims below.

What is claimed is:

1. A diskette for use in connection with a computer for magnetically storing data thereon, the diskette comprising:

a magnetic data storage area comprising:

a plurality of generally concentric tracks divided into sectors identified by a sector number, each sector including a 1024 byte field for storing data; and an inter-sector gap between adjacent sectors on each respective track, wherein each inter-sector gap is thirty-six bytes.

2. The diskette of claim 1 wherein at least one track includes nine sectors.

3. The diskette of claim 1 wherein the sectors on each track are arranged such that consecutively-numbered sectors are separated by a predetermined amount of storage area.

4. The diskette of claim 3 wherein said predetermined amount of storage area is at least one sector.

5. The diskette of claim 1 wherein the last sector on one track and the first sector on the next adjacent track are offset by a predetermined amount of storage space.

6. The diskette of claim 5 wherein said predetermined amount of storage space is at least two sectors.

\* \* \* \* \*